United States Patent
Hughes et al.

(10) Patent No.: US 9,677,398 B2
(45) Date of Patent: *Jun. 13, 2017

(54) USE OF VENTILATION AIR METHANE EXHAUSTED DURING MINING OF NON-COMBUSTIBLE ORE IN A SURFACE APPLIANCE

(75) Inventors: Ronald O. Hughes, Green River, WY (US); Bryan M. Mortimer, Highlands Ranch, CO (US); David M. Hansen, Green River, WY (US)

(73) Assignee: Solvay Chemicals, Inc., Houston, TX (US)

( * ) Notice: Subject to any disclaimer, the term of this patent is extended or adjusted under 35 U.S.C. 154(b) by 939 days.

This patent is subject to a terminal disclaimer.

(21) Appl. No.: 13/446,952

(22) Filed: Apr. 13, 2012

(65) Prior Publication Data
US 2012/0264068 A1 Oct. 18, 2012

Related U.S. Application Data

(60) Provisional application No. 61/475,905, filed on Apr. 15, 2011.

(51) Int. Cl.
*E21F 7/00* (2006.01)
*E21C 41/20* (2006.01)
(Continued)

(52) U.S. Cl.
CPC ............... *E21C 41/20* (2013.01); *E21F 7/00* (2013.01); *F23G 5/46* (2013.01); *F23G 7/06* (2013.01);
(Continued)

(58) Field of Classification Search
CPC ....................................................... E21F 7/00
See application file for complete search history.

(56) References Cited

U.S. PATENT DOCUMENTS 3,479,133 A   11/1969   Warzel
3,479,134 A   11/1969   Warzel
(Continued)

FOREIGN PATENT DOCUMENTS

GB          170465 A      10/1921
WO    WO 2008070931 A1   6/2008

OTHER PUBLICATIONS

EPA Coalbed Methane Outreach Program Technical Options Series Energy From Ventilation Air Methane (VAM) Using Oxidation Technologies Apr. 2004.*

(Continued)

*Primary Examiner* — John Kreck
(74) *Attorney, Agent, or Firm* — Beatrice C. Ortego

(57) ABSTRACT

Utilization of mine methane produced by mining a non-combustible ore, such as trona, as an energy source for heat, steam, and/or power generation. Such utilization is beneficial for a surface appliance which is close to surface outlet(s) of mine methane recovery system(s). A method for reducing greenhouse gas emissions generated during mining of a non-combustible ore uses the combustion of co-produced mine methane. The mine methane is recovered in a mine ventilation air exhaust with very low methane content, and may be additionally recovered in a drainage gas, such as gob gas, with much higher methane content. The surface appliance may be selected from the group consisting of calciner, dryer, boiler, kiln, furnace, engine, turbine, power generation unit, co-generation unit, and any combinations thereof. Benefits may include reduction in energy purchases, reduction in greenhouse emissions, and/or gain through sale of carbon credits to the carbon market by registering carbon reductions.

22 Claims, 5 Drawing Sheets

(51) Int. Cl.
  *F23G 5/46* (2006.01)
  *F23G 7/06* (2006.01)
(52) U.S. Cl.
  CPC ......... *F23G 2206/203* (2013.01); *Y02E 20/12* (2013.01)

(56) References Cited

U.S. PATENT DOCUMENTS

| | | | |
|---|---|---|---|
| 3,778,108 A * | 12/1973 | Pennington et al. | 299/11 |
| 3,934,649 A | 1/1976 | Pasini et al. | |
| 4,017,121 A | 4/1977 | Trent | |
| 4,305,464 A | 12/1981 | Masszi | |
| 4,978,172 A * | 12/1990 | Schwoebel et al. | 299/12 |
| 5,246,273 A | 9/1993 | Rosar | |
| 5,270,023 A * | 12/1993 | May | C01D 7/18 423/182 |
| 7,363,883 B2 * | 4/2008 | Ito et al. | 123/3 |
| 7,587,999 B2 | 9/2009 | Ito et al. | |
| 7,591,866 B2 * | 9/2009 | Bose | 55/337 |
| 8,740,310 B2 * | 6/2014 | Refsdal et al. | 299/12 |
| 2007/0231233 A1 | 10/2007 | Bose | |
| 2009/0315388 A1 | 12/2009 | Refsdal et al. | |

OTHER PUBLICATIONS

Johnson, Philip W., et al—"Use of Mine Ventilation Exhaust as Combustion Air in Gas-Fired Turbo-Electric Generators", 1998, IEEE Transactions on Industry Applications, vol. 34, Issue No. 2, pp. 399-405; 7 pgs.

Wendt, Michael N., et al—"Hybrid Coal and Gas Turbine System Development for Mitigation of Greenhouse Gas at Coal Mines", Dec. 4, 2001, Presentation No. 5-4; in Session 5: "Greenhouse Gas Control & CO2 Sequestration-I" at the 18th Annual International Pittsburgh Coal Conference held in Newcastle, New South Wales, Australia—Abstract only—the Conference abstract booklet retrieved online on Mar. 14, 2011 and being accessible at http://www.engineering.pitt.edu/Coal_Conference/Past_Conferences_2001.aspx; 3 pgs.

Su, S., et al—"Coal mine ventilation air methane catalytic combustion gas turbine", 2002, Proceedings of the 6$^{TH}$ International Conference on Greenhouse Gas Control Technologies held in Kyoto, Japan, Oct. 1-4, 2002 (copyright 2003), vol. 2, Editor(s): Gale, John; Kaya, Yoichi., Publisher: Elsevier Ltd., Oxford, UK.; pp. 1287-1292; 6 pgs.

Su, S., et al—"Development of Ventilation Air Methane Catalytic Combustion Gas Turbine"; 2003, Third International Methane and Nitrous Oxide Mitigation Conference, Beijing, Nov. 17-21, 2003 ; retrieved online Mar. 14, 2011 via http://www.coalinfo.net.cn/coalbed/meeting/2203/papers/coal-mining/CM004.pdf; pp. 1-10; 10 pgs.

Mallett, C.W., et al—"Progress in developing ventilation air methane mitigation and utilization technologies"; 2003, 3$^{rd}$ International Methane and Nitrous Oxide Mitigation Conference held Nov. 17-21, 2003, Hotel Kunlun, Beijing, China; retrieved online on Mar. 14, 2011 from Internet source—http://www.coalinfo.net.cn/coalbed/meeting/2203/papers/coal-mining/CM003.pdf; 18 pgs.

[Unknown Author], EPA Coalbed Methane Outreach Program Technical Options Series, "Using Ventilation Air Methane (VAM) as Combustion Air in Reciprocating Engines and Turbines", Mar. 2004, retrieved online on Mar. 14, 2011 http://www.epa.gov/cmop/docs/vam_combustion_air.pdf• 4 pgs.

Warmuzinski, Krzysztof, "Harnessing methane emissions from coal mining", 2008, Process Safety and Environment Protection, vol. 86, Issue No. 5, pp. 315-320; 6 pgs.

You, Changfu, et al—"Utilization of Ventilation Air Methane as a Supplementary Fuel at a Circulating Fluidized Bed Combustion Boiler", 2008, Environmental Science & Technology, Issue No. 42, Issue No. 7, pp. 2590-2593; 4 pgs.

Carothers, F. Peter, "Mitigation of Methane Emissions from Coal Mine Ventilation Air", 2008, a presentation for New Trends in Coal Mine Methane Recovery and Utilization—A workshop in Association with the International Mining Forum held in Szczyrk, Poland on Feb. 27-29, 2008; retrieved online on Mar. 14, 2011 via internet source: http://imf.net.pl/files_imf/uploads/www.imf_.net_.pl_F.%20Peter%20Carothers.pdf 41 pgs.

[Unknown Author], "Ventilation Air Methane (VAM): Utilization Technologies", Issue dated Nov. 2009; U.S. EPA Coalbed Methane: Outreach Program retrieved online on Mar. 7, 2011 via http://www.epa.gov/cmop/docs/vam_technology.pdf; 4 pgs.

Yang, Z., et al—"Research progress in the utilization of ventilation air methane as an energy source"; Feb. 2010, Natural Gas Industry, vol. 30, Issue 2, pp. 115-118;—in Chinese language—including Abstract in English; 5 pgs.

Somers, J.M., et al—"Coal mine ventilation air emissions: project development planning and mitigation technologies"; 2010, 13th United States/ North American Mine Ventilation Symposium, Hardcastle & McKinnon—Editors, retrieved online on Mar. 7, 2011 from: www.epa.gov/cmop/docs/vam-planning-mitigation.pdf, 7 pgs.

* cited by examiner

USE OF VENTILATION AIR METHANE EXHAUSTED DURING MINING OF NON-COMBUSTIBLE ORE IN A SURFACE APPLIANCE

CROSS-REFERENCE TO RELATED APPLICATIONS

The present application claims priority benefit to U.S. provisional application No. 61/475,905, filed on Apr. 15, 2011, the whole content (including drawings) of this application being herein incorporated by reference for all purposes.

STATEMENT REGARDING FEDERALLY SPONSORED RESEARCH OR DEVELOPMENT

Not applicable.

TECHNICAL FIELD OF THE INVENTION

The invention relates to a method for using mine methane exhausted during the mining of non-combustible ore as an energy source and/or combustion air in a surface refinery which processes the mined ore close to the mining operation. The invention particularly relates to a method for reducing greenhouse gas emissions caused during trona mining which employs ventilation air methane and optionally other methane-containing vent gases in the production of heat, steam, and/or electricity in one or more surface refinery appliances.

BACKGROUND OF THE INVENTION

During mining operations in an underground gassy mine comprising a non-combustible ore (specifically trona), methane is often liberated from methane-bearing strata.

Trona ore is a mineral that contains about 90-95% sodium sesquicarbonate ($Na_2CO_3 \cdot NaHCO_3 \cdot 2H_2O$). A vast deposit of the mineral trona is found in southwestern Wyoming near Green River. This deposit includes layers of trona and mixed trona and halite (rock salt or NaCl) which covers approximately 2,600 km². The major trona beds range in size from less than 428 km² to at least 1,870 km². By conservative estimates, these major trona beds contain about 75 billion metric tons of ore. The different beds overlap each other and are separated by layers of shale and marlstone. The quality of the trona varies depending on its particular location in the stratum.

A typical analysis of the trona ore mined in Green River is as follows:

TABLE 1

| Constituent | Weight Percent |
| --- | --- |
| $Na_2CO_3$ | 43.2 |
| $NaHCO_3$ | 33.7 |
| $H_2O$ (crystalline and free moisture) | 15.6 |
| NaCl | 0.1 |
| Insolubles | 7.3 |

The sodium sesquicarbonate found in trona ore is a complex salt that is soluble in water. The mined trona ore is processed generally in a surface refinery to remove the insoluble material, organic matter and other impurities to recover the valuable alkali contained in the trona.

The most valuable alkali produced from trona is sodium carbonate. Sodium carbonate is one of the largest volume alkaline commodities produced in the United States. In 2007, trona-based sodium carbonate from Wyoming comprised about 91% of total U.S. soda ash production. Sodium carbonate finds major use in the glass-making industry and for the production of baking soda, detergents and paper products.

The trona deposits found in Southwestern Wyoming are formed in multiple beds in the Wilkins Peak Member of the Eocene Green River Formation at depths ranging from 240 to 910 meters (800-3000 feet). The Wyoming trona deposits are evaporites that form substantially horizontal beds. The beds vary greatly in thickness, from about 0.3 meter to about 5 meters (about 1-16 feet). The underground formation containing the trona beds generally includes multiple methane-bearing layers as well. For example, layers of mainly weak, laminated green-grey shales and oil shale may be found in strata both above and below a trona bed. Both overlying and underlying shale layers can liberate methane during mining. It is also possible for marlstone layers to liberate entrapped methane upon fracture. The trona itself contains very little carbonaceous material and therefore liberates very little methane. Yet methane is liberated during mining due to its release from the surrounding shale layers The mining techniques employed may include longwall mining, shortwall mining, solution, mining, room-and-pillar mining, or various combinations.

When utilizing a trona mining technique that either exposes or fractures one or more methane bearing shales, a significant amount of mine gas can be liberated from the fractured oil shale(s). Mining techniques, such as longwall mining, that involve overburden caving may release substantial volumes of methane. Mine methane is defined as methane gas liberated as a direct consequence of mining activity. Along with the mine methane lower concentrations of other gases such as non-methane hydrocarbons, nitrogen, ammonia, and carbon dioxide, may be found.

Once released, mine methane can mix with the mine ventilation air. In such event, the released methane must be quickly diluted with fresh air to safe levels well below the methane lower explosive limit (LEL), which in normal air is 5% methane. There is indeed an explosive range for methane in air from 5 to 15%. In most cases this ventilation air methane (VAM) must be diluted to below 1% in the return airways of the mine's ventilation system in order to meet legal requirements. This high dilution in ventilation air must be done to ensure the safety of mine personnel, regardless of the mining technique employed.

By using the mine ventilation system, the methane concentration is diluted with air from a high level to a low level. The greater the volumetric flow rate of released methane, the greater the volumetric flow of ventilation air required to dilute it. If there is an increase in methane release, additional air flow is necessary for dilution to achieve a methane content generally well below the LEL. Additionally, safety regulations require a maximum allowable methane content in the return airways where personnel is present; this maximum allowable methane content is generally 1% or less. In the case of a bleeder system, the methane content may be as high as 2%.

The amount of methane released by specific mining techniques can vary widely, but in general, techniques that expose and/or fracture the methane-bearing strata will release significantly larger volumes of mine methane than those that do not. The additional air requirement for mining techniques which result in higher methane release will also increase ventilation pressure which results in increased air leakage through ventilation structures and increased energy consumption.

In some mines, techniques such as longwall mining can release so much gas that they require an additional drainage system to directly extract methane from drainage wells drilled above or in a 'gob' (also called 'goaf'), an area of fractured rock that forms as the mine roof collapses following ore extraction. Direct methane drainage reduces the amount of gas in the gob and surrounding rock, and therefore less methane is available to be released into the mine airways. This allows for a reduced ventilation air flow, but does not eliminate the need for air ventilation.

While mine ventilation systems are effective in ensuring safe working conditions underground, they create an environmental problem at the surface, as the ventilation air methane (VAM) is generally exhausted to the atmosphere. Even though a drainage system can be effective in recovering gob gas with high methane content, the drainage gas flow rate to the surface is typically at least one or two orders of magnitude lower than the flow rate of return ventilation air. Thus there may be a much higher volumetric output of methane exhausted to the surface from ventilation air than from a gob vent well.

Because ventilation air flow rates are so high, ventilation air methane can constitute a large source of methane emissions from gassy mines contributing significantly to global greenhouse emissions. As a greenhouse gas, methane is 21 times more effective in heat trapping than carbon dioxide over a 100-year period. Thus, efforts in mitigating methane emissions from ventilation air can provide significant environmental benefits. The global carbon market now offers an incentive for mitigating these emissions in the form of carbon credits that constitute an additional revenue stream for gassy mines. Mitigation thus provides some value to the mine operators.

However other significant energy and economic benefits could be obtained if, in addition, the energetic value of the methane (calorific value of 1000 Btu per cubic feet) could be captured. VAM exhaust essentially wastes a potential clean energy resource, but it is difficult to use as an energy source because of the large air volume and low methane content. Flow rates of several hundred thousand to several millions of actual cubic feet per minute or ACFM of ventilation air containing less than 1% methane are typical. The low concentration of methane requires either use of the ventilation air in its dilute state or concentration up to levels that can be used in methane-fueled engines. Concentration can be costly and difficult to achieve, and utilization has been focused on oxidation of very low concentration methane.

For oxidation even at such low $CH_4$ levels, one may employ processes classified as thermal and catalytic oxidizers. A thermal oxidizer for example is a very large, expensive, complex, and inefficient device which can be operated with levels around 1-1.5% methane. But since the ventilation air with a small amount of methane is not easily combustible, such operation requires significant pre-heating which renders a thermal oxidizer quite costly to operate. In most cases due to size and cost constraints, the thermal oxidizer can only treat a fraction of the total ventilation air exhaust with the remainder going to the atmosphere. The main limitation of the thermal and catalytic oxidizers is the difficulty in extracting useful energy for power generation from VAM, so these oxidizers generally are only used to mitigate the greenhouse impact of the treated methane emissions. Any beneficial utilization of this ventilation air methane presents significant challenges. In fact, the only practical applications for the use of VAM as an energy source would be as combustion air for methane-fueled devices located in close proximity to the return air exhausts.

Unlike coal mining, Applicants believe that trona mining is particularly well suited for beneficial utilization of this ventilation air methane. It presents an unusual combination of both having gassy trona mines that emit substantial methane during mining and nearby surface processes that can use the energetic value of the emitted methane. Indeed a trona mine has some level of ventilation air methane near a soda ash refinery where the trona is processed, and this soda ash refinery near the trona mine will have surfaces appliances that can combust ventilation air methane.

Although these foregoing issues have been and will be described in terms of trona mining, they also apply to any mine from which a non-combustible ore (e.g., evaporite or metal/non-metal ore) is extracted and which is capable of liberating methane during the mining of the non-combustible ore.

SUMMARY OF THE INVENTION

One aspect of this invention relates to the recovery of the mine methane produced as the result of mining a non-combustible ore and its use as a valuable energy source. The non-combustible ore bed to be mined may comprise at least one evaporite mineral selected from the group consisting of trona, nahcolite, and Wegscheiderite, preferably trona.

The mine methane is preferably recovered via a mine ventilation system which generates a ventilation air stream with low methane content. Such methane is sometimes called "Ventilation Air Methane" or VAM.

The mine methane may be additionally recovered via a drainage system such as gob vent system which produces a drainage gas stream with much higher methane content than the ventilation air.

The mine methane is typically not recovered via a pre-mining drainage system since there is generally no release of methane from the non-combustible ore bed before mining takes place.

The present invention particularly relates to the utilization of ventilation air methane formed during the mining of non-combustible ore (such as trona) by applying the ventilation air as air for supporting combustion in at least one surface appliance, so that at least a portion of the methane originating from the ventilation air is burnt. This utilization (rather than exhaust to atmosphere) becomes especially useful and economically possible when the surface appliance is close to the ventilation exhaust.

As an example, the ventilation exhaust of a trona mine is advantageously close to a surface refinery which processes the mined trona to produce soda ash. This surface refinery may have various appliances with energy needs, which generally consume a fuel like natural gas and/or coal. These appliances of the surface refinery typically require high air volumes and high operating temperatures.

A specific aspect of this invention relates to the utilization of mine methane produced as the result of mining at least one evaporite mineral selected from the group consisting of trona, nahcolite, and Wegscheiderite, preferably mining of trona, for the generation of heat, steam, and/or electricity. Such utilization of the mine methane is preferably done in one or more surface appliances of a refinery for the manufacture of soda ash and/or any derivatives (e.g., sodium bicarbonate, sodium sulfite, sodium bisulfite, sodium sesquicarbonate, . . . ) which is/are close to the surface outlet(s) of the one or more mine methane recovery systems.

Yet another aspect of the invention relates to a method for reducing the greenhouse gas emissions during mining of a non-combustible ore (e.g., trona, nahcolite, Wegscheiderite, preferably trona) with co-production of mine methane from an underground formation. A benefit for this mitigation may be gained through sale of carbon credits to the carbon market by registering carbon reductions as the use of mine methane as an energy source diminishes the overall energy need from external sources.

At least a part of this energy source (ventilation air methane) can be used in the surface refinery which processes the mined non-combustible ore to produce a desired product, such as producing soda ash (sodium carbonate) and/or any derivatives from mined trona.

The mine ventilation air containing dilute levels of methane is exhausted to the surface and may be directed into at least one surface appliance which typically oxidizes one or more combustible material sources, e.g., fuel (natural gas and/or coal). Because of the exothermicity of the oxidation of methane with oxygen ($O_2$)—both being present in the mine ventilation air, the oxidation of methane will generate heat which can be used, directly or indirectly, in the surface appliance(s) by way of useful heat, steam, and/or electricity generation, thereby offsetting an equivalent energetic quantity of typically purchased fuel (e.g., natural gas and/or coal).

Utilization technologies for VAM can be divided into two basic categories: ancillary uses and principal uses. For the ancillary uses, methane in the ventilation air is a supplemental fuel. For the principle uses, methane in the ventilation air is the primary fuel. In both cases, ventilation air is used to substitute ambient air in combustion processes.

One embodiment of the present invention includes a method for utilizing ventilation air methane (VAM) exhausted during mining of a non-combustible ore from an underground formation which comprises an ore bed and at least one methane-bearing layer. At least one methane-bearing layer may be overlying the bed, underlying the bed, and/or imbedded in the bed.

Another embodiment of the present invention relates to a method for reducing greenhouse emissions during mining of a non-combustible ore with co-production of ventilation air methane (VAM) from the underground formation.

A particular method according to the present invention comprises:
  mining at least a portion of the ore bed to extract non-combustible ore and form a mined-out cavity, said mining being carried out in a manner effective to cause fracture and/or exposure of the at least one methane-bearing layer which releases mine methane into the mined-out cavity, wherein the non-combustible ore preferably comprises at least one evaporite mineral selected from the group consisting of trona, nahcolite, and Wegscheiderite, more preferably comprises trona,
  applying an air flow to the mined-out cavity for ventilation in a manner sufficient to dilute the methane content in the mined-out cavity to provide a ventilation air stream containing less than 5% methane, preferably at most 2%, or more preferably at most 1%;
  directing at least a portion of said methane-containing ventilation air stream exhausted to the surface to at least one surface appliance of a refinery where the mined non-combustible ore is processed, to use at least a part of the methane present in said portion of the ventilation air stream in said at least one surface appliance as an energy source to generate heat, steam, and/or electricity.

In some embodiments, at least a portion of air from the ventilation air stream is used as 'combustion air' to support combustion of at least a part of the methane contained herein and/or other combustible material originating from another fuel source (e.g., any gaseous alkane from natural gas and/or methane from a mine drainage gas).

The concentration of methane in said ventilation air stream (exhausted to the surface) is preferably at most 2%, or at most 1%.

In some embodiments, the concentration of methane in the ventilation air stream may be less than 5% but more than 2% where it is allowable by law or by virtue of the remoteness from humans of the ventilation application.

The non-combustible ore may comprise sodium carbonate, sodium bicarbonate, sodium sesquicarbonate, or combinations thereof, or any other non-combustible mineral extracted from an underground gassy mine. Preferably, the non-combustible ore comprises or consists of trona.

The surface appliance may be selected from the group consisting of calciner, dryer, boiler, kiln, burner, furnace, engine, turbine, electrical power generation unit, co-generation unit, microturbine, catalytic oxidizer, thermal oxidizer, catalytic combustor, lean-burn catalytic turbine, any plurality thereof, and any combinations thereof. Some surfaces appliances may be integrated so that one appliance may use at least a part of a useful energetic output from another appliance.

When the methane in the ventilation air stream is used as a primary fuel source in at least one surface appliance, the surface appliance may be selected from the group consisting of microturbine, catalytic oxidizer, thermal oxidizer, catalytic combustor, lean-burn catalytic turbine, any plurality thereof, and any combinations thereof.

When the methane in the ventilation air stream is used as a supplemental fuel source in at least one surface appliance, the surface appliance may be selected from the group consisting of calciner, dryer, boiler, kiln, furnace, burner, internal combustion engine, gas turbine, steam turbine, electric power generation unit, co-generation unit, any plurality thereof, and any combinations thereof. The method further comprises directing an additional fuel source to such surface appliance. The additional fuel source preferably includes or is a methane-containing gas. The additional fuel source may be a natural gas stream or a drainage gas stream. The natural gas stream is typically purchased and delivered via pipeline to the surface appliance. The drainage gas stream may be exhausted from the same mining operation from which ventilation air methane is exhausted or from another mining operation nearby. The additional fuel source may include or may be coal.

When the surface appliance is a calciner or dryer comprising a kiln or furnace, the additional fuel source and the ventilation air are both directed to the kiln or furnace of the calciner or dryer, and at least a portion of the ventilation air methane and at least a portion of the additional fuel source are combusted in the kiln or furnace to produce heat for the calciner or dryer.

When the surface appliance is a co-generation plant, the additional fuel source and the ventilation air are both directed to the co-generation plant, and at least a portion of the ventilation air methane and at least a part of the additional fuel source are combusted to ultimately generate steam and electricity.

In some embodiments, a first portion of the ventilation air methane provides a first energy source to produce heat and/or steam in a first surface appliance, and wherein a second portion of the ventilation air methane provides a second energy source to produce steam and electricity in a second surface appliance. The first surface appliance may be a kiln, a furnace, a boiler, a dryer, a calciner (a kiln or furnace may be included in the calciner or dryer), any plurality thereof, or any combinations of two or more thereof. The second surface appliance may be a gas turbine, a steam turbine, an engine, an electric power generation plant, a co-generation plant, any plurality thereof, or any combinations of two or more thereof. A gas or steam turbine may be included in the electric power generation plant or the co-generation plant.

In some embodiments, the method further comprises directing an additional fuel source to at least one surface appliance. The additional fuel source may include or may be coal, a gaseous hydrocarbon, or any mixtures thereof. In preferred embodiments, the additional fuel source may be a methane-containing gas with a methane content of at least 15%, preferably of at least 25%, more preferably of at least 30%, even yet more preferably of at least 50%. For example, the additional fuel source may be a natural gas stream (e.g., with a minimum of 85% methane) or a drainage gas stream (such as a $CH_4$-rich mine gas collected from a gob or 'goal' typically with a minimum of 25% methane, or preferably with a minimum of 30% methane).

In preferred embodiments, such additional fuel and the methane present in the ventilation air stream may be simultaneously combusted with oxygen ($O_2$) present in the ventilation air stream. The combustion reaction (illustrated out below for methane) will generate heat, water, and carbon dioxide.

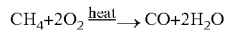
$$CH_4 + 2O_2 \xrightarrow{heat} CO_2 + 2H_2O$$

In such embodiments, the combined flows of the additional fuel source and the ventilation air stream to the surface appliance may have an $O_2/CH_4$ molar ratio which is higher than the stoichiometric ratio for complete combustion of methane, that is to say, there is a stoichiometric excess of $O_2$.

In some embodiments, the combined flows of the additional fuel source and the ventilation air stream to the surface appliance may have an overall methane content between 0.5 and 25%. When the additional fuel source is a $CH_4$-rich gas and the methane in the ventilation air stream is used as a supplemental fuel, the majority (i.e., 50% or more) of the methane directed to the surface appliance originates from the additional fuel source. Alternatively, when the methane in the ventilation air stream (with e.g., between 0.5 and 1% $CH_4$) is used as a primary fuel source and small amount of a $CH_4$-rich gas as the additional fuel source is used, the majority (i.e., 50% or more) of the methane directed to the surface appliance originates from the ventilation air stream.

The mining step in the method may comprise longwall mining, shortwall mining, solution mining, and/or room-and-pillar mining; preferably comprises longwall mining, shortwall mining, and/or room-and-pillar mining; more preferably, the mining step comprises at least longwall mining.

During mining, the roof of the mined-out cavity is allowed to cave in to form a gob thereby allowing the released mine methane to flow into the gob. The method may further comprise recovering a gob gas stream comprising at least part of the released methane through a drainage well in fluid communication with the gob to the surface.

The method may further direct at least a portion of the gob gas stream to at least one surface appliance, wherein the surface appliance receiving the gob gas stream may be the same or different than the surface appliance receiving the ventilation air stream, preferably the same. The concentration of methane in the recovered gob gas stream may be at least 25% or preferably at least 30%.

The mining step may comprise:
providing at least an initial cavity into the underground formation, the initial cavity giving access to an initial working face of the ore bed to be mined;
mining an ore region from the initial working face and removing the mined ore, thereby creating a subsequent mined-out cavity with a new subsequent working face;
advancing the mining step to another ore region from the subsequent working face;
allowing the roof of the initial cavity to cave so as to create the gob on one side of the working face and a mined-out cavity on the other side of the working face;
repeating the mining, advancing and caving steps, in a manner effective to cause fracture of at least one methane-bearing layer and release of mine methane from said fractured methane-bearing layer into the gob and in the mined-out cavity.

The method may further comprise a drainage step. The drainage step may comprise drilling a least one drainage well from the earth's surface towards the ore bed. The well preferably has a downhole end positioned above the ore bed roof, so that the downhole end of the drainage well is not in contact with the ore bed to be mined.

The caving step should also be effective in ultimately establishing fluid communication between the gob and the downhole end of the drainage well.

The drainage step may further comprise recovering a drainage gas stream comprising some of the released methane through the drainage well to the surface. The drainage gas is preferably recovered from the gob, and hence may be called 'gob gas'.

The method according to some embodiments of the present invention may further comprise directing at least a portion of said drainage gas stream to at least one surface appliance of the refinery where the mined non-combustible ore is processed, wherein said at least one surface appliance uses methane present in said portion of the drainage gas stream as a fuel source to generate heat, steam, and/or electricity.

In some embodiments, at least one surface appliance of the refinery receives at least a portion of the drainage gas stream to be used as a primary fuel source and also receives at least a portion of said ventilation air stream to be used as supplemental fuel and which supplies at least a portion of combustion air. The two fuel sources (drainage gas stream and ventilation air stream) directed to the at least one surface appliance may be mixed prior to being fed to the surface appliance, or may be fed separately to the at least one surface appliance. Optionally, additional fuel sources such as natural gas and/or coal may be supplemented to increase the Btu content of the resulting overall feedstock supplied to the at least one surface appliance.

Another aspect relates to a method for reducing green house emissions during mining of a non-combustible ore with co-production of ventilation air methane (VAM) from an underground formation, which comprises the method for utilizing ventilation air methane (VAM) exhausted during mining of the non-combustible ore in at least one surface appliance.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions or methods do not depart from the spirit and scope of the invention as set forth in the appended claims.

BRIEF DESCRIPTION OF THE DRAWINGS

For a detailed description of the preferred embodiments of the invention, reference will now be made to the accompanying drawings which are provided for example and not limitation, in which.

On the figures, identical numbers correspond to similar references.

DETAILED DESCRIPTION OF THE PREFERRED EMBODIMENTS

Figure 1:
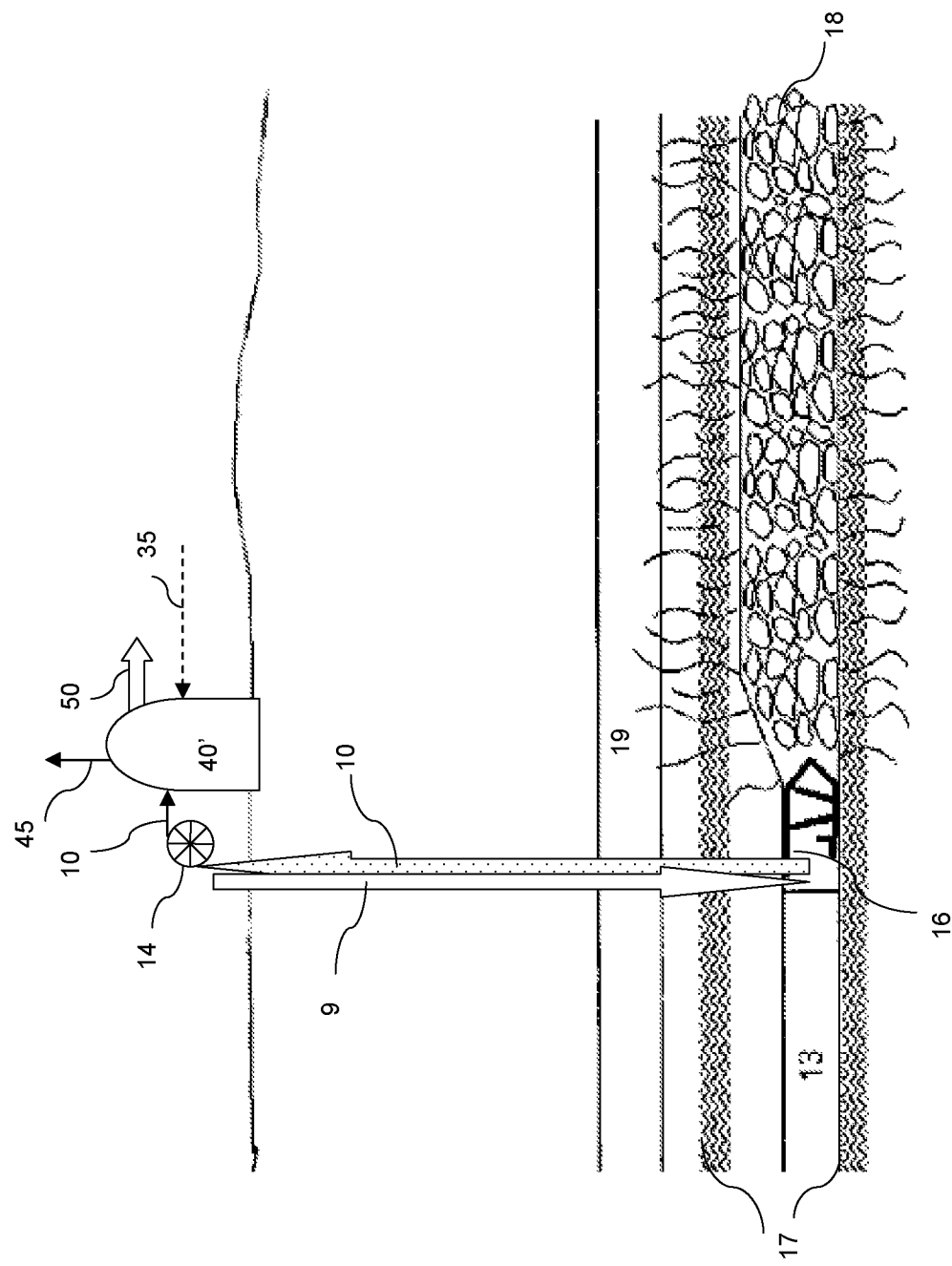
FIG. 1 illustrates an elevation view of a mining system for a method of extraction and utilization of VAM generated during trona mining according to one embodiment of the present invention, wherein methane released by fracture of at least one methane-bearing layer is ventilated via mine air, exhausted at the surface and used in a surface appliance.

The method comprises mining at least a portion of the ore bed to extract non-combustible ore and form a mined-out cavity, said mining being carried out in a manner effective to cause exposure and/or fracture of the methane-bearing layer which releases mine methane into the mined-out cavity.
Non-Combustible Ore The ore bed to be mined may comprise any suitable non-combustible ore containing a desirable mineral. The non-combustible ore preferably is essentially free (not more than 5%) of coal, crude oil, tar, oil shale, or any mixtures thereof, or more preferably does not contain coal, crude oil, tar, or any mixtures thereof. The non-combustible ore preferably is essentially free of (entrapped and/or adsorbed) gaseous hydrocarbons, e.g., not more than 1% of $C_1$-$C_5$ hydrocarbons. The non-combustible ore is generally a layer made of one or more inorganic compounds.

The non-combustible ore bed preferably contains a desired mineral, a metal/non-metal ore, or a precursor thereof which can be obtained by processing the mined ore in a surface refinery. In preferred embodiments, the ore bed to be mined may comprise an evaporite mineral. A suitable evaporite mineral may comprise an element selected from the group consisting of halite, carbonate, sesquicarbonate, bicarbonate, nitrate, iodate, borate, sulfate, and phosphate. In some embodiments, the evaporite mineral may be selected from the group consisting of trona, nahcolite, Wegscheiderite, halite, potash, langbeinite, sylvite, and carnalite. In preferred embodiments, the non-combustible ore bed to be mined comprises at least one evaporite mineral selected from the group consisting of trona, nahcolite, and Wegscheiderite. The non-combustible ore preferably comprises sodium carbonate, sodium bicarbonate, sodium sesquicarbonate, or combinations thereof. The ore bed preferably contains a desired sodium mineral or a precursor thereof which is selected from the group consisting of sodium sesquicarbonate, sodium bicarbonate, and sodium carbonate.

In yet more preferred embodiments, the non-combustible ore bed comprises trona or any evaporite deposit containing sodium sesquicarbonate, carbonate and/or bicarbonate, or even more preferably consists of a trona bed (also called 'trona seam').

A trona bed or seam may have a thickness of from a few inches to 30 feet (0.1 m-9.1 m). Mechanically mineable trona seams are typically considered to be greater than six feet thick (2 m). The trona seams may be located at a depth of from 244 to 910 meters (from about 800 to 3000 feet) below the surface. A trona bed is generally higher in compressive strength than the overlying and underlying strata.

In alternate embodiments, the non-combustible ore bed contains potash.
Methane-Bearing Layer The underground formation which comprises the non-combustible ore bed to be mined having a roof and a floor may have at least one overlying methane-bearing layer above the ore bed roof and/or may have at least one underlying methane-bearing layer below the ore bed floor. Generally, the overlying and/or underlying methane-bearing layer is distinct from the non-combustible ore bed. The methane-bearing layer may be an oil shale layer.

In the example of trona mining, interbedded with trona deposits may be layers of green to gray shales, marlstones, and oil shale. In the case of trona Bed 17 near Green River, Wyoming, oil shale layers occur both above and below the trona bed, and methane is liberated from these oil shale layers during mining. Indeed, when mining of trona causes part of the trona roof to cave and form a gob with fallen rock nibbles, a significant amount of mine methane may be released due to (1) the caving action of the mining system which results in the fragmentation of the immediate mine roof and fracturing of at least one overlying methane-bearing layer positioned above the trona bed roof, and/or (2)

the release of pressure on strata below the floor of the trona bed which allows methane to rise from of at least one exposed and/or fractured underlying methane-bearing layer into the mined-out cavity left by mining. This released mine methane can collect in the mined-out cavity and/or the gob (caved portion) at high concentrations.

Mining Method

The mining step in the present method is particularly useful for the mining of a trona bed. It should be understood that any following or foregoing embodiments which are described in terms of trona mining are equally applicable to the mining of non-combustible ore which results in methane release, unless otherwise stated.

The mining step according to the present invention extracts non-combustible ore and mine methane from an underground (subterranean) formation which comprises at least one methane-bearing layer and a non-combustible ore bed to be mined. The mining step according to the invention can use one or more mining techniques. Any mining method which results in the caving of the rock overlying the ore bed and exposure and/or fracture of at least one methane-bearing layer (positioned above and/or below the ore bed) or any methane-bearing stratum in proximity to the ore bed lends itself to the recovery of mine methane through the mine ventilation system and an optional gob drainage system.

The mining step may include one or more mining techniques selected from the group consisting of room-and-pillar mining, longwall mining, shortwall mining, and solution mining. The mining step in such method preferably includes at least one mining technique selected from the group consisting of longwall mining and shortwall mining, and more preferably includes at least longwall mining. Room-and-pillar mining technique may be used in the mining step of the present invention, although it is generally observed that much less methane is released with such technique compared to the other mechanical mining techniques which result in fracture of at least one methane-bearing layer. A technique known as "full pillar extraction" might create caving of the overburden and form a subsequent gob with associated gob gas, but "full pillar" mining is not a commonly accepted practice in trona extraction.

In the room-and-pillar technique, a number of rooms are created in the underground formation, connected by an array of tunnels. Between the rooms, a series of trona pillars are left in place to support the roof of the mine rooms. The disadvantage of this technique is that the ore contained in the pillars is usually not mined, resulting in a loss of valuable ore.

In the "longwall" mining technique, the ore bed roof is supported by movable hydraulic supports as the ore is mined. After mining the ore, the supports are advanced, allowing the unsupported roof to collapse. The caved-in area comprising fallen broken rock may be referred to as "gob" or "goaf". The gob formation is generally accompanied by fracture and/or exposure of overlying and/or underlying methane-containing layers.

The "shortwall" mining technique is similar in principle to the longwall mining, except that the ore working face is much less wide and hydraulic roof supports may not be employed. The "shortwall" mining technique may be employed to mine the ore from pillars left over after a room-and-pillar technique was used. After mining the pillars or parts thereof, the unsupported roof can collapse which may expose and/or fracture overlying and/or underlying methane-containing layers.

Longwall mining, shortwall mining, and room-and-pillar mining require miners and heavy machinery to be underground.

Solution mining is an ore extraction process by which a mineral is extracted from an underground formation by injecting a solvent (usually water or an aqueous solution) into the mineral-containing ore body. The solvent dissolves the mineral which causes the density of the resulting solution to increase. The denser, mineral-enriched solution then sinks to the base of the ore bed where an extraction well pumps the mineral-saturated brine (or liquor) to the surface for processing. The solution mining can create a mined-out cavity within the ore. From the weight of the overburden, caving of overlying trona and rock may occur, which could result in strata subsidence as well as exposure and/or fracture of underlying and/or overlying methane-containing layers, thus liberating mine methane into the caved-in area. Solution mining does not require miners or heavy mining machinery to be underground.

Hybrid mining technique can also be used in the mining step of the present invention. This hybrid technique utilizes solution mining of the pillars left after the room-and-pillar mining method. It typically causes heaving of the oil shale floor and caving of the roof resulting in fractures in at least one overlying, underlying or imbedded methane-bearing layer thereby releasing methane.

In some embodiments, the mining step creates a gob (or goaf), i.e., a caved-in area containing rock nibbles from collapse of ore roof. Such mining step may comprise:

providing at least a first (initial) mined-out cavity into the underground formation, the first cavity giving access to a first (initial) working face of the ore bed to be mined;

mining a region of the ore from the first (initial) working face;

removing the mined ore, thereby creating a second (subsequent) mined-out cavity with a second (subsequent) working face;

advancing the mining step to another ore region from the second (subsequent) working face;

allowing the top of the first (initial) mined-out cavity to cave so as to create a gob containing rock nibbles; and repeating the mining, advancing and caving steps in a manner effective to enlarge the volume of the gob while reducing the volume of ore to be mined.

It should be understood that the first mined-out (or initial) cavity which is used to initiate the mining step according to the present method, may have been previously mined by the same technique used during the mining step of the present method or by a different technique selected from the group consisting of room-and-pillar mining, long-wall mining, short-wall mining, and solution mining.

At least a part of the unsupported roof of the first (initial) cavity caves to generate the gob. The caving step during mining may be effective in causing the release of mine methane into the gob from at least one fractured and/or exposed methane-bearing layer underlying or overlying the ore bed or embedded in the non-combustible ore bed.

Mine Ventilation

The method further comprises applying an air flow to the mined-out cavity for ventilation to form a ventilation air stream with an air flow being sufficient to dilute the methane content of said ventilation air stream to 5% or less, or to 2% or less, to 1% or less.

The flow rates of air for ventilation can vary from place to place within the mine and be of, on a volumetric basis, ranging from a few thousand actual cubic feet per minute (ACFM) in a particular place to several millions CFM from the mining operation as a whole. Flow range could be from less than 10,000 ACFM to over 1,000,000 ACFM with a typical range being from 100,000 ACFM to 500,000 ACFM for a trona mine.

The method additionally may comprise exhausting the ventilation air stream to the surface via a ventilation exhaust system employing either induced draft or forced draft ventilation fans or a combination of the two. For the implementation of exhaustion of the ventilation air stream to the surface, it would be preferred to use one or more exhaust shafts having a smaller diameter than a typical mine shaft (which allows passage of miners lift and equipment). A diameter from 4 to 7 feet or from 5 to 6 feet for the exhaust shaft would be acceptable. Additionally, surface conduit(s) may be installed to direct at least some portion of the ventilation air to one or more surface appliances. The one or more ventilation fans draw air from the mine into the exhaust shaft to the surface where at least some portion is then flowed into the conduits to reach the surface appliances using it.

The concentration of methane in the exhausted ventilation air may be preferably at most 5%, or at most 2%, or at most 1%. Typical methane content values for such ventilation air may be as low as 0.05%, or at least 0.1%, or at least to 0.2%, or at least to 0.3%, or at least to 0.4%. The concentration of methane in such ventilation air may vary from 0.1 to 0.9%.

The ventilation air exiting a trona mine being mined using at least longwall mining may generally comprise at most 2.0% methane, or most 1% methane, or at most 0.9% methane, or at most 0.8% methane, or even sometimes at most 0.75% methane. Typical methane content values for a ventilation air may range from 0.2% to 1%, or from 0.3% to 0.9%, or from 0.4% to 0.8%, or from 0.5% to 0.8%, or even from 0.6% to 0.8%. Other methane content values for a ventilation air may range from 0.1% to 0.6% or from 0.2% to 0.5%. For a longwall mining operation of a trona mine, the ventilation air exiting the mine may generally comprise about 0.6-0.8% methane at about 3 to 6.5 million ACF methane per day.

The ventilation air exiting a trona mine being mined using room-and-pillar mining may generally comprise at most 0.5% methane or at most 0.4% methane or even sometimes at most 0.3% methane. Typical methane content values for such ventilation air may be as low as 0.02% or 0.05%. The methane content for such ventilation air may range from 0.02% to 0.5%, or from 0.02% to 0.4%, or from 0.05% to 0.3%. For a room-and-pillar mining operation of a trona mine, the ventilation air exiting the mine may generally comprise about 0.05% methane at about 500,000 to 1 million ACF of methane per day.

In the case of longwall mining in particular, the ability to provide adequate ventilation to a longwall panel can be a major factor in the success of an installation, especially in gassy conditions. The tendency for longwall panels to become longer and wider and for machinery to become larger increases panel resistance making the ventilation task more challenging, particularly when development constraints from time or cost considerations lead to the need to minimize the amount of development which is acceptable. Generally, the thinner the seam, the more difficult the ventilation challenge becomes.

A preferred longwall mining operation with air ventilation is illustrated in FIG. 1. During the mining of an ore bed 13, its roof is supported by movable hydraulic supports. After mining the ore working face, the supports are advanced, allowing the unsupported roof to collapse. The unsupported roof of a mined-out cavity 16 collapses thus creating a gob 18 containing rock nibbles. The caving action also generates fractures 19 in overlying and/or underlying methane-bearing layers 17 (e.g., oil shale) above the gob 18 and below the ore bed 13 which liberate mine methane from these layers 17 into the gob 18. The caving action may also cause exposure of some of the methane-bearing layers 17 to the mine air. In this embodiment, the majority of the mine methane released from fractured and/or exposed layers 17 can flow towards the trona working face in the mined-out cavity 16, for the methane to be diluted by the high-flow rate intake air stream 9 which then sweeps the ore working face in the mined-out cavity 16. The resulting mine ventilation air stream 10 is exhausted via a fan 14 to the surface.

Although in FIG. 1 the ventilation air is shown to flow in and out of the mined-out cavity 16 to the surface, in practice the ventilation air generally flows along galleries/roadways (e.g., maingate, tailgate, bleeder) typically in fluid communication with the mined-out cavity 16.

Figure 3:
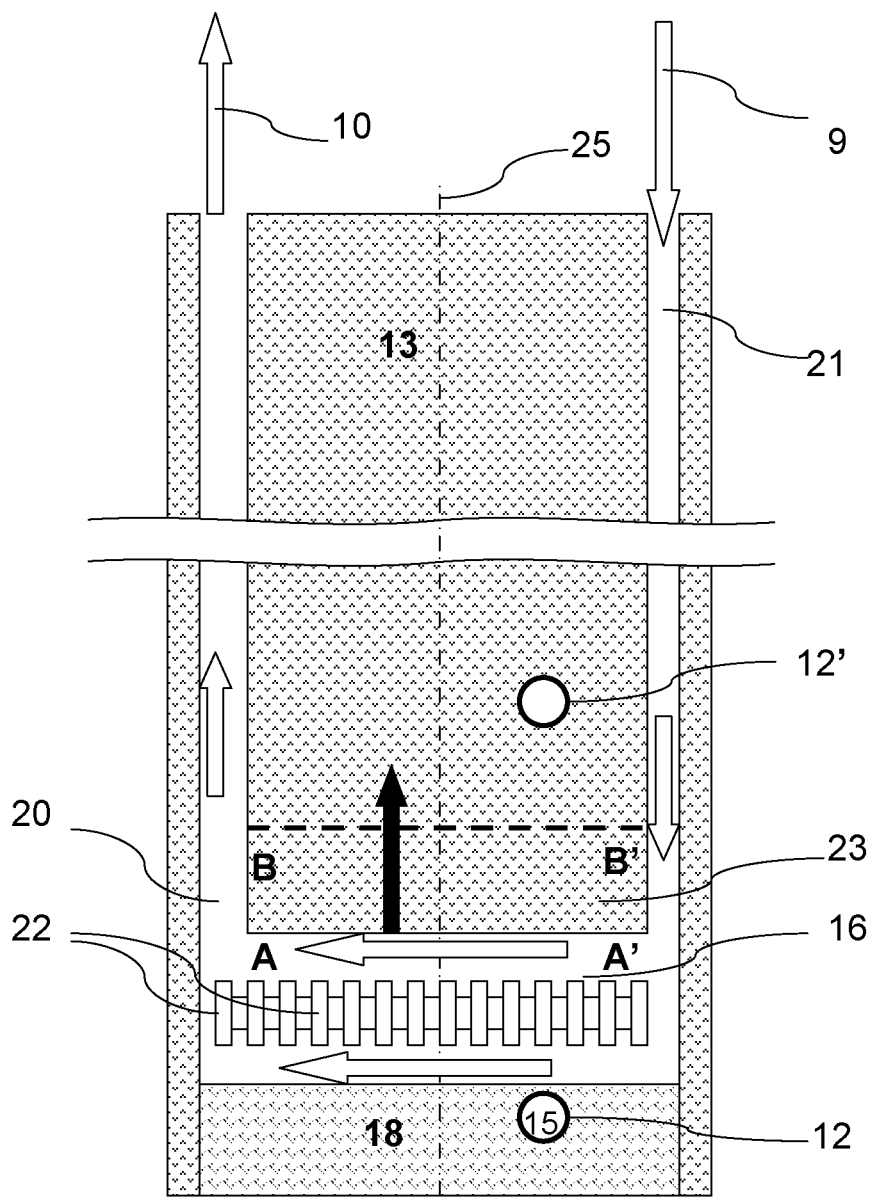
FIG. 3 illustrates a plan view of a long-wall mining system and its operation for producing non-combustible ore and mine methane according to an embodiment of the present invention, wherein at least one drainage well positioned above the ore bed is in fluid communication with a gob to exhaust gob methane, and wherein a mine ventilation system exhausts ventilation air methane.

High ventilating pressures is carried out by the use of large surface fans and/or underground booster fans. There are three basic ways of ventilating a longwall panel:

"U Ventilation" where intake air comes in the maingate and returns in the tailgate; there is no connection to any airways behind the face line. If a longwall advancing face is ever used, this is the only means of ventilation available. FIG. 3 illustrates such ventilation pattern with intake air (stream 9) in the maingate (passage 21) and return ventilation air (stream 10) in the tailgate (passage 20).

"R Ventilation" in which the main ventilation circuit is as for U ventilation, but there is another connection (a "bleeder") maintained to return airways behind the ore face, typically a gallery alongside the gob.

"Z or Y Ventilation" where both main and tailgates carry intake air and all the return air is carried to main returns behind the ore face. With this system a variable regulator on the maingate intake is often used to adjust the balance between ore face flow and maingate intake flow.

There are other possible variations, especially if more roadways are available at each end of the ore face, however the majority of underground mines use one of the above ventilation arrangements.

For U and R ventilation, the air flow across the face itself is from main to tail (in the opposite direction to the mined ore flow). For Z ventilation the air flow is from tail to main.

With regard to controlling methane gas concentrations in the airways (and face temperatures if these are a problem), the greater the air flow the better in general. However on a longwall face where there is invariably a lot of dust and fine ore powder, air velocities of more than 3-4 meters/second become very uncomfortable and this may limit the quantity of air which can reasonably be supplied. For this reason, U ventilation may be challenging.

With R ventilation, the methane gas released from the ore face and the gob is split in two directions, some diluted by the face air and some by air which sweeps the ore face and becomes a bleed to other main returns.

With the Z system all the gas passes to the returns behind the face, but extra intake air is added to the flow from the face adjacent to the maingate.

With the R and Z systems, local control of the ventilation is often carried out using pressure measurements at regulators rather than measuring flows, the pressure values for ideal conditions being determined by experience. At times the process may be holding the gas front in the gob away from the ore face. Because the gob is open ended, any gas release must be removed somewhere and it is prevented from coming onto the ore working face by being directed towards some other location.

Additional Fuel Source

In some embodiments, the method further comprises directing an additional fuel source to at least one surface appliance.

At least a portion of the additional fuel source can be used as supplemental or primary fuel for combustion in at least one surface appliance.

The additional fuel source may comprise or may consist of a solid fuel (e.g., coal), one or more gaseous hydrocarbons, or any mixtures thereof. In preferred embodiments, the additional fuel source may comprise or may consist of a methane-containing gas with a methane content of at least 25%, preferably of at least 30%, even more preferably of at least 50%. For example, the additional fuel source may comprise or may be a natural gas stream (e.g., with a minimum of 85% methane) or a drainage gas stream (e.g., a $CH_4$-rich mine gas collected from a gob or 'goal', a so-called 'gob gas' typically with a minimum of 25% methane, preferably with a minimum of 30%). In some embodiments, the additional fuel source may comprise or may be coal.

A drainage gas stream containing methane can be recovered to the surface by way of a drainage well and then directed to the surface appliance from the mine with an appropriate gas moving means (e.g., one or more exhausters or pumps). One or more conduits (e.g., pipeline) will be necessary to flow the drainage gas stream from the surface outlet of the drainage well to the surface appliance, as the surface outlet of the drainage well may be within a few hundred feet to a few miles from the surface appliance which uses the drainage gas.

The additional fuel and methane originating from the ventilation air stream may be simultaneously combusted with oxygen ($O_2$) originating from the ventilation air stream. The combustion reaction (illustrated previously with methane) will generate heat, water, and carbon dioxide.

In such embodiments, the combined flows of the additional fuel source and the ventilation air stream to the surface appliance may have a $O_2/CH_4$ molar ratio between 0.1 and 20, or preferably from 0.5 to 5, or more preferably from 1 to 3, most preferably from 1.5 to 2.5.

The combined flows of the additional fuel source and the ventilation air stream to the surface appliance may have a $O_2/CH_4$ molar ratio which is higher than the stoichiometric ratio (>2) for complete combustion of methane, so as to operate in excess of $O_2$ compared to $CH_4$.

In some embodiments, the combined flows of the additional fuel source and the ventilation air stream to the surface appliance may achieve an overall methane content in the surface appliance between 0.5 and 33%, or between 0.8 and 25%.

The combined flows may have an overall methane content between 1 and 5% or between 15 and 25% when the additional fuel source is a $CH_4$-rich gas and the methane in the ventilation air stream is used as a supplemental fuel (that is to say, the majority of the methane, that is to say 50% or more, directed to the surface appliance originates from the additional fuel source).

Alternatively, the combined flows may have an overall methane content between 0.8 and 2% when the methane in the ventilation air stream (with e.g., between 0.5 and 1% $CH_4$) is used as a primary fuel source and small amount of a $CH_4$-rich gas as the additional fuel source is used (that is to say, the majority of the methane directed to the surface appliance originates from the ventilation air stream).

Surface Appliance

The invention can advantageously provide a source of energy for a surface facility which processes the mined non-combustible ore in order to extract a desired mineral or product (e.g., soda ash, metal or nonmetal), such as processing mined trona in a soda ash refinery. It is recommended that at least a part of the recovered VAM and optionally drainage gas be directed to the ore processing facility or refinery to be used as an energy source for the operation of one or more pieces of equipment used in the processing facility. Examples of use may be heat generation by combustion in one or more kilns, furnaces, or gas turbines, steam generation in boilers, and/or electricity generation from engines or turbines, such as gas and/or steam turbines.

At least a portion of air originating from the ventilation air stream is used as combustion air, while the methane originating from the ventilation air stream can be used as supplemental or primary fuel for combustion in at least one surface appliance.

The recovered ventilation air stream containing methane can be directed to the surface appliance from the mine by way of a shaft with a diameter of a few feet (e.g., from 5 to 15 feet, preferably from 5 to 6 feet) with an appropriate air moving means (e.g., one or more fans). The appropriate air moving means may include one or more induced draft fans, one or more forced air draft fans, or combinations thereof. Additional conduit will be necessary to flow the ventilation air from the shaft to the surface appliance. The ventilation exhaust (outlet) at the surface end of the shaft is typically close to the surface appliance which uses VAM, that is to say, the ventilation exhaust may be located less than a mile from the surface appliance, more typically within a few feet to a few hundred feet (for example from 5 to about 990 feet or about 1.8-300 m).

In instances when there are more than one exhaust shaft, the ventilation air exhausted from a first shaft may be directed to a first appliance, while the ventilation air exhausted from another (second) shaft may be directed to another (second) appliance.

The surface appliance may be selected from the group consisting of calciner, dryer, boiler, kiln, burner, furnace, internal combustion engine, gas turbine, steam turbine, electric power generation plant, co-generation unit, microturbine, catalytic oxidizer, thermal oxidizer, catalytic combustor, lean-burn catalytic turbine, and any combinations thereof. The surface appliance may comprise any plurality thereof and/or any combination thereof. Any of these surface appliance units may be omitted from this list.

The surface appliance is preferably selected from the group consisting of calciner, dryer, boiler, kiln, furnace, burner, engine, gas turbine, steam turbine, electric power generation plant, co-generation unit, and any combinations thereof. A microturbine, catalytic combustor, lean-burn catalytic turbine, catalytic oxidizer, or thermal oxidizer may be used, preferably when another surface appliance is used. Some surfaces appliances may be integrated so that one appliance may generate a first useful energetic output (e.g., heat, steam) and another appliance may generate a second useful energetic output when using at least a portion of the first useful energetic output.

The surface appliance may comprise a calciner or dryer, and in such instances, ventilation air methane is directed to a kiln or furnace of the calciner or dryer, so that at least a portion of the ventilation air is used as air for combustion in the kiln or furnace. An additional fuel source (e.g., natural gas and/or drainage gas for a kiln burner; or coal for a furnace) is preferably directed to the kiln burner or furnace of the calciner or dryer, so that at least a portion of the ventilation air methane and at least a portion of the additional fuel source are combusted in the kiln or furnace to produce heat for the calciner or dryer.

In the case of trona mining, mined trona is generally calcined in one or more calciners, and/or soda ash product may be dried in one or more dryers. At least one of these calciners or dryers may be fed with at least a portion of the recovered VAM, carried in the ventilation air stream, to be consumed as combustion air. A calciner or dryer requires heat, which can be provided by burning (combusting) at least a portion of the ventilation air methane with oxygen originating from the ventilation air in a kiln burner or furnace. Additional fuel is typically added to adjust the Btu content of the entire amount of fuel (combined VAM/additional fuel) fed to the kiln or furnace for sufficient heat generation to achieve the desired heating temperature for the calciner or dryer.

The surface appliance may comprise or may be a co-generation plant which simultaneously generates both electricity and useful heat (such as steam or hot water). Cogeneration is a thermodynamically efficient use of fuel. In power plants during electricity generation, some energy must emit a certain amount of waste heat which can be released into the natural environment through cooling towers, flue gas, or by other means, but in cogeneration plants, there is a capture of some or all of this by-product heat to produce steam or hot water.

In such surface appliance, at least a portion of the ventilation air and an additional methane-containing fuel source (e.g., natural gas and/or some gob gas) are directed to the co-generation plant, so that at least a portion of the ventilation air methane and at least a part of the additional methane are combusted to ultimately generate useful heat (e.g., steam) and electricity.

In some embodiments for trona mining and refining, a first portion of the ventilation air methane provides a first energy source to produce a first energetic output (heat) in a first surface appliance which is a dryer or a calciner, and wherein a second portion of the ventilation air methane provides a second energy source in a second surface appliance which is a gas turbine or a co-generation plant to produce a second energetic output (steam and/or electricity).

A cogeneration plant may comprise or consist of an engine, a steam turbine, or a gas (combustion) turbine that drives an electrical generator. A waste heat exchanger recovers waste heat from the engine and/or exhaust gas to produce hot water or steam. Cogeneration produces a given amount of electric power and process heat with 10% to 30% less fuel than it takes to produce the electricity and process heat separately. There are two main types of cogeneration techniques: "Topping Cycle" plants, and "Bottoming Cycle" plants.

A topping cycle plant generates electricity or mechanical power first. Facilities that generate electrical power may produce the electricity for their own use, and then sell any excess power to a utility company.

There are four types of topping cycle cogeneration systems. The first type burns fuel in a gas turbine or diesel engine to produce electrical or mechanical power. The exhaust provides process heat, or goes to a heat recovery boiler to create steam to drive a secondary steam turbine. This is a combined-cycle topping system. The second type of system burns fuel (any type) to produce high-pressure steam that then passes through a steam turbine to produce power. The exhaust provides low-pressure process steam. This is a steam-turbine topping system. A third type burns a fuel such as natural gas, ventilation air methane, or gob gas methane. The hot water from the engine jacket cooling system flows to a heat recovery boiler, where it is converted to process steam and hot water for space heating. The fourth type is a gas-turbine topping system. A natural gas turbine drives a generator. The exhaust gas goes to a heat recovery boiler that makes process steam and process heat. A topping cycle cogeneration plant always uses some additional fuel, beyond what is needed for manufacturing, so there is an operating cost associated with the power production.

Bottoming cycle plants are much less common than topping cycle plants. These plants exist in heavy industries where very high temperature furnaces are used. A waste heat recovery boiler recaptures waste heat from a manufacturing heating process. This waste heat is then used to produce steam that drives a steam turbine to produce electricity. Since fuel is burned first in the production process, no extra fuel is required to produce electricity.

The co-generation plant may comprise a gas turbine. A gas turbine, also called a combustion turbine, is a rotary engine that extracts energy from a flow of combustion gas. It has an upstream compressor coupled to a downstream turbine, and a combustion chamber in-between. Gas turbine may also refer to just the turbine component. Energy is added to a gas stream in the combustor, where fuel is mixed with air and ignited. In the high pressure environment of the combustor, combustion of the fuel increases the temperature. The products of the combustion are forced into the turbine section. There, the high velocity and volume of the gas flow is directed through a nozzle over the turbine's blades, spinning the turbine which powers the compressor and, for some turbines, drives their mechanical output. The energy given up to the turbine comes from the reduction in the temperature and pressure of the exhaust gas. A gas turbine can be particularly efficient—up to 60%—when its waste heat can be recovered by a heat recovery steam generator to power a steam turbine in a combined cycle configuration. It can also be run in a cogeneration configuration in which the exhaust of the gas turbine is used for water heating.

The co-generation plant may comprise a heat recovery steam generator (HRSG) which is a steam boiler that uses hot exhaust gases from one or more gas turbines to heat up water and generate steam. This steam in turn can drive a steam turbine to generate more electricity and/or can be used in processes of the surface refinery that require heat.

The co-generation plant may comprise a steam turbine. Steam is created by a boiler, where pure water passes through a series of tubes to capture heat from a firebox and then boils under high pressure to become superheated steam. The heat in the firebox can be provided by burning in this case ventilation methane and some additional natural gas or gob gas. The superheated steam leaving the boiler then enters the steam turbine throttle, where it powers the turbine and connected generator to make electricity. After the steam expands through the turbine, it exits the back end of the turbine, where it is cooled and condensed back to water in the surface condenser. This condensate is then returned to the boiler through high-pressure feed pumps for reuse. Heat from the condensing steam is normally rejected from the condenser to a body of water, such as a river or cooling tower.

The surface appliance may comprise a thermal oxidizer and/or a microturbine.

Ventilation Air Methane Thermal Oxidizers are commonly referred to as a VAMTOX. They are very specific and extremely efficient—energy recovery efficiency can reach 95%. This is achieved through the storage of heat in dense ceramic stoneware. Ventilation Air Methane Thermal Oxidizers are used for the very low methane concentrations (e.g., 1% or less) with the larger processing requirements. These specialized systems are capable of 95-98+% methane ($CH_4$) destruction efficiencies.

VAMTOX systems have a system of valves and dampers that direct the methane flow across the ceramic bed. On system start up the system preheats and raises the temperature of the heat exchange material in the oxidizer bed to or above the auto-oxidation temperature of methane. The preheating temperature can vary greatly between oxidizer systems. Most thermal oxidizer systems operate between 850° C. (1562° F.) and 1,000° C. (1,832° F.). After pre-heating to the desired temperature, the preheating system is turned off and ventilation air exhaust is introduced. When the methane-filled air reaches the preheated bed, heat from the combustion is released. This heat is transferred to the bed, thereby maintaining its temperature at or above what is necessary to support auto-thermal operation. It should be noted that the oxidation process is flameless and, following the initial bed preheating, requires no auxiliary energy so long as adequate inflow methane concentrations are maintained (generally when there is a methane concentration above 0.8%).

Combining the VAMTOX systems exhaust stream with heat exchangers can provide electrical power by use of superheated steam powering a turbine generator. VAMTOX may be designed with multiple hot air bypass systems for high spike levels of methane during the changing mining operation. Other additional equipment such as re-circulation heat exchanger's and microturbine power generation systems may be implemented to capture exhausted energy for conversion.

Microturbine designs usually consist of a single stage radial compressor, a single stage radial turbine and a recuperator. Exhaust heat can be used for water heating, space heating, drying processes or absorption chillers, which create cold for air conditioning from heat energy instead of electric energy. Typical microturbine efficiencies are from 25 to 35%. When in a combined heat and power cogeneration system, efficiencies of greater than 80% are commonly achieved.

When only a portion of the volumetric flow of VAM is directed to one or more surface appliances, any portion of the VAM which is not utilized in the surface appliance(s) described above may be vented to atmosphere and/or may be directed to a flare or incinerator.

Optional Drainage Systems

Figure 2:
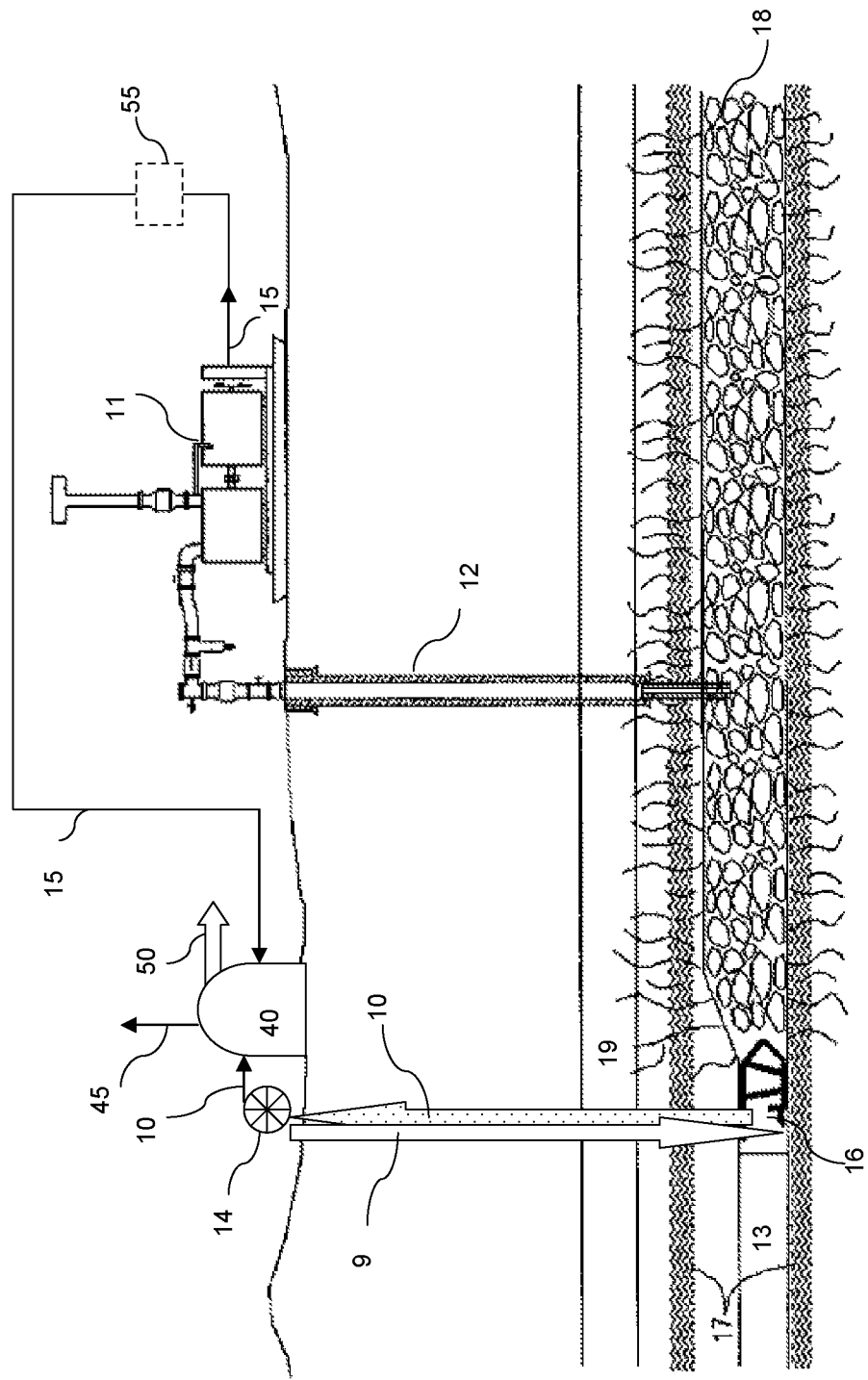
FIG. 2 illustrates an elevation view of a mining system for a method of extraction and utilization of VAM generated during trona mining according to another embodiment of the present invention, wherein one part of the methane (VAM) released by fracture of at least one methane-bearing layer is ventilated via mine air and wherein another part of the released methane (gob methane) is collected via a drainage well positioned above a trona bed in fluid communication with a gob, both of these methane-containing gas streams being exhausted separately at the surface and utilized in a surface appliance.

As mentioned previously, there may be two kinds of mine methane gas which can be recovered from a trona mine, as shown in FIG. 2 and FIG. 3. One is recovered methane gas recovered by a vacuum pump or exhauster from one or more boreholes for drainage for safety, and the other is ventilated methane gas exhausted together with the ventilation air from one or more mine shafts and trona seams. The concentration of methane in the former may be from 25% to 95%, and the methane content of the latter is extremely low, and may be as high as 2% (e.g., from 0.3 to 0.9%).

When it is not possible to control any methane gas release successfully by applying a sufficiently high air flow through the ventilation system, there are supplemental bleeder and drainage possibilities.

The use of "bleeder" airways where higher gas levels than that normally permitted by statutory limits are allowed and personnel access is prevented unless production is stopped and gas levels reduced.

Cross-measure post drainage where boreholes are drilled through the strata above and/or below the ore bed and connected to a gas drainage system to capture some of the released methane before it can reach the mine airways.

Gob drainage where released methane is drawn from the gob cavity either underground by pipes which are open to the gob area and connected to a gas drainage system or is directed to surface through one or more boreholes drilled to (or close to) the gob cavity from the surface.

For the latter two options, suction may be applied to the gas drainage system or surface boreholes to assist methane capture.

For a gob where methane predominates, buoyancy effects of the gas will assist in keeping gas away from the working face if the longwall mining is worked down dip.

Such drainage system can provide a means to recover at least a part of the additional fuel source which can be utilized in conjunction to the ventilation air methane in at least one surface appliance.

A drainage gas stream (e.g., originating from the gob space via a vertical or directionally-drilled drainage well) may be directed to a surface appliance so that the methane contained in such gob gas stream can be combusted simultaneously with the ventilation air methane. Typically, a gob gas stream can be recovered at a surface location which is not far from the mining shaft (within a few miles) and transported to the surface appliance by means of one or more conduits such as pipeline(s) from the surface outlets.

First the methane released inside the gob needs to be exhausted from the gob to the surface. In order to extract the mine methane from the gob, the drainage step may comprise: drilling a least one drainage well from the earth's surface in a downward manner towards the ore bed to be mined.

It is preferred that the drainage well is drilled ahead of the longwall face and does not come in contact with the ore bed to be mined, that is to say, the drainage well does not reach or intersect the roof of the non-combustible ore bed to be mined. The drainage well has a downhole end positioned above the ore bed roof. The subterranean location of the downhole end of the drainage well should be such that the downhole end of the drainage well is not in contact with non-combustible ore. The drainage well should be cased with steel pipe over most of its entire length, and a suitable portion of the downhole part of the well may be perforated or slotted as to allow mine methane to flow freely into the drainage well.

The drainage well may comprise a vertical portion. The drainage well (or a portion thereof) may be slanted with respect to the axial centerline of the ore bed to be mined. It is preferred that the drainage well be substantially vertical. The term 'substantially' is used for well positioning, as it is meant to include some variation (within 10%) of the actual direction of the drainage well. In the case of longwall mining of trona, it is preferred that the drainage well may be drilled from a surface location offset from the axial centerline of a trona panel.

The caving step should be effective in ultimately establishing fluid communication between the gob and the downhole end of the drainage well.

Additional details for an example of a drainage well for trona mining which can be applied here can be found in paragraphs [0036]-[0037] and [0054]-[0064] of U.S. Pre- Grant Patent Application Publication US2009/0315388, these paragraphs being incorporated herein by reference, to the extent that such disclosure provides additional information on the drainage well characteristics, its downhole end with an optional slotted and moveable casing, and its placement with respect to the ore bed and gob.

It is desirable that as the mining of the ore advances in subsequent mined-out adjacent cavities and the gob is progressively getting larger, the downhole end of the drainage well becomes surrounded with the gob, thus establishing fluid communication between the gob and the well. In that manner, the methane circulating in the gob is able to migrate upwards towards the downhole end of the well. Since methane has a relative density compared to air of about 0.55, this buoyancy allows methane to move upwards in the gob. This upwards methane movement should minimize the migration of methane towards the working (mining) face of the ore being mined. In this way, a significant portion of the released methane can be vented at the earth's surface by passing through a well. For this reason, this drainage well may be called a "gob vent" well or "gob vent" borehole (GVB).

The method further comprises recovering a gob gas stream comprising at least a portion of the released methane that passes from the gob through the drainage well to the surface. The recovered gob gas may comprise at least 25% methane and up to about 98% methane.

It is preferred that the drainage well be drilled before the gob formation, so that methane recovery may begin as soon as it is released by at least one exposed and/or fractured overlying and/or underlying methane-bearing layer. Even though it is preferred for the drainage well to be drilled before mining is initiated underneath its downhole end, there should be no methane release until the rock surrounding the drainage well downhole end begins caving. That is to say, there is no pre-mining release of methane. The mine methane release is only due to the caving of the unsupported roof of a mined-out area, such caving that causes exposure and/or fractures in the methane-bearing layer(s) above the gob or even below the gob, which allow methane to be released. Eventually the caving action also establishes fluid communication between the gob and the drainage well.

An embodiment of the mining of a trona bed 13 with both gob methane and VAM recovery is illustrated in FIG. 2. The depth of a drainage well 12 is such that its downhole end of the drainage well 12 is kept above the roof of the trona bed 13. This ensures that, during the mining of the trona free face, the drainage well 12 is not in communication with the trona mined-out cavity 16.

As the long-wall mined-out cavity 16 advances past the downhole end of the drainage well 12 as shown in FIG. 2, the unsupported roof of the mined-out cavity collapses thus creating the gob 18 containing rock nibbles. The caving action also generates fractures 19 in the oil shale layers 17 above the gob 18 and below the bed 13 which liberate mine methane from these layers 17 into the gob 18. In this preferred embodiment, some of the mine methane released from fractured oil shale layers 17 can be extracted to the surface via the drainage well 12 with the help of a methane-powered vacuum pump 11 (as shown in FIG. 2) to generate a gob gas stream 15. The methane flow towards the trona working face may be largely minimized during mining with the help of such drainage well, thus diminishing the potential safety hazards to the miners and mining equipment. Some released methane still penetrates behind the working face into the mined-out cavity 16, but this methane is diluted by the high-flow rate intake air stream 9 which then sweeps the working surface in the mined-out cavity 16 to be exhausted to the surface via a fan 14 as the ventilation air stream 10.

The method according to the invention is effective in reducing the content of methane in the gob (caved area) behind the ore working face. The gob gas stream 15 containing methane can be exhausted directly to the surface through the gob drainage well 12.

A methane-powered engine coupled to a vacuum pump or an exhauster (11) is preferably used to exhaust the gob gas containing at least a portion of the released methane directly from the gob. The engine is preferably powered by at least a part of the gob methane. With the use of the gob drainage well and the methane-powered pump which draws a vacuum, the infiltration of the exhausted gob gas into the return airways of the mine ventilation system can be reduced, thus requiring a much lower flow rate of fresh intake air stream 9.

An advantageous embodiment employing the long-wall mining step of a trona bed with air ventilation and gas drainage from a gob is illustrated in FIG. 3 (plan view). Two parallel passages 20 (tailgate) and 21 (maingate) are created into an underground formation and then connected laterally by the creation of an initial cavity 16, thereby defining a trona panel 13 having, as length, about the length of the parallel passages and, as width, the length of the initial cavity 16, the working face of the trona panel 13 (shown as line AA') extending from one parallel passage 20 to the other passage 21. Such mining method further comprises supporting the roof of the initial cavity 16 by means of movable roof supports 22 and mining the exposed face AA' of the trona panel 13 under the protection of the roof supports 22. The roof supports 22 thus prevent roof caving in this initial cavity 16 while a new trona region with the working face AA' is being mined. The mining method would then comprise removing several inches or feet of the mined trona material to form a (second or subsequent) newly mined-out cavity (shown as 23 in FIG. 3). A conveyor (not shown in FIG. 3) generally located in the passage 21 (maingate) is used to remove the mined trona away from the mining surface to be directed to the surface for further processing. As the working face recedes within the trona panel 13, the long-wall mining method would then comprise advancing the roof supports 22 into the (second) subsequent mined-out cavity 23 created by the cutting and removal of ore from the previous face AA' so that they remain essentially adjacent to a new working face (illustrated with a dashed line BB'). Due to the advance of the roof supports 22 leaving the previously supported roof of the initial cavity 16 unsupported, the pressure of the rock overburden causes caving of its unsupported roof to form the gob 18.

The long-wall mining method thus comprises incrementally repeating the mining step of the exposed face of the ore panel 13 under the protection of roof supports 22, the mined ore removal step, the advancing of roof supports 22, and the caving of unsupported roof to enlarge the gob 18.

For air ventilation, the incoming air stream 9 typically flows through the passage 21 (maingate) to sweep air across the working face in the mined-out cavity 16 to dilute the methane which is released in such cavity. In the configuration of FIG. 3, a U-shaped ventilation pattern is used in which the ventilation air stream 10 containing mine methane exits the mine through the passage 20 (tailgate).

In this embodiment using the longwall mining technique illustrated in FIG. 3, it is particularly preferred to drain the gob and recover the gob gas via two vertical drainage wells 12, 12'. Wells 12, 12' are drilled from the earth's surface between the two parallel passages 20, 21 to a subterranean location above the trona panel 13. The two drainage wells are preferably drilled offset from the axial centerline 25 of the trona panel 13. The two drainage wells 12, 12' are separated from each other by a distance less than the panel length, preferably a distance comprised between one third and two thirds of the length of the trona panel 13. As the long-wall working face advances, the downhole ends of the two vertical drainage wells 12, 12' are then successively surrounded by fractured rock in the formed gob 18. As shown in FIG. 3, only one of the vertical drainage wells (12) is surrounded by the gob 18. Since the gob 18 has not yet reached the subterranean location of the downhole end of the second vertical drainage well 12', the gob gas stream 15 is solely recovered from the first vertical gob drainage well 12.

Another embodiment of the method (not illustrated) with gob methane recovery may employ solution mining of a non-combustible ore bed which comprises a desired mineral solute. This solution mining method may comprise creating a lined or cased portion of a borehole from the surface down to the ore bed roof at a desired location, preferably within a down-dip region of the ore bed, and further extending the borehole with an unlined portion past the ore bed floor to form a sump in which a downhole pump is installed. The solution mining may further comprise drilling a directional unlined borehole portion to travel more horizontally, above the ore floor, within a region of the ore bed, preferably from the sump toward an up-dip region where an initial mined-out cavity is present or will be created.

The solution mining step further comprises injecting a solvent (generally water or an unsaturated solution) through the unlined borehole portion (for example by inserting into the unlined portion a concentric conduit with a solvent injection zone positioned at the conduit downhole extremity) in order to expose an ore region to the solvent and allow dissolution of desired mineral solute from the solvent-exposed ore. The dissolution thereby increases the size of the unlined borehole portion where the initial mined-out cavity (e.g., of increased cross-sectional area) is either created or increased in size if already present and connected to the downhole end of the unlined borehole portion.

The solution mining step may further comprise moving the injection point of the solvent (e.g., retracting or perforating the concentric conduit) to continue the dissolution process and to form the subsequent enlarged mined-out cavity (generally along the unlined borehole portion which is embedded in the ore bed).

Additionally or alternatively, the subsequent mined-out cavity may be created and enlarged by gravity-driven flow of solvent and dissolution of mineral solute from the ore working face.

Since the roof of the mined-out cavity is not supported, if the surrounding strata is weaker than the ore bed, gravitational energy from the overburden may 1/cause fracture of fresh ore positioned above the mined-out cavity into nibbles and the collapse of some ore nibbles into the mined-out area; 2/possibly cause caving and/or fracturing of overlying roof rock; and 3/induce exposure and/or fracturing of at least one methane-bearing layer above or below the ore bed which can liberate methane into the caved-in region.

In such solution mining embodiment, there may be fluid communication established between the ore region being mined and the caved-in region containing nibbles, since the ore region being mined is positioned below the rock nibbles. However since mine methane gas is much lighter in density relative to mine air, mine methane stratifies in the upper zone of the caved-in area.

A drainage well for venting methane may be placed strategically above the initial cavity (where solution mining is initiated), positioned generally in an up-dip region of the non-combustible ore. Similarly as with longwall mining, the downhole end of the drainage well does not contact the ore bed to be mined as it is positioned above the ore roof. It is the caving of the roof rock and ore located above the mined-out cavity which creates the formation of the gob and establishes fluid communication between the gob and the downhole end of the drainage well.

An example of a solution mining with a gob gas recovery which can be applied here has been described in paragraphs [0072]-[0087] of U.S. Pre-Grant Patent Application Publication 2009/0315388 by Larry Refsdal et al, such paragraphs of this application being herein incorporated by reference.

It should be understood that VAM may be recovered from a section of non-combustible ore bed which is mined by a mechanical mining technique, while a drainage gas (e.g., gob gas) may be recovered from another section of the same non-combustible ore bed which is mined by another mining technique such as solution mining.

Gob Gas

Regardless of which mining technique is used in the method of the present invention, the recovered gob gas which comprises some released mine methane can have a very high methane content. Since methane has a specific gravity relative to air of 0.55, methane rises to the highest level in the gob. When the downhole end of the drainage well becomes substantially in fluid communication with the gob, methane gas preferentially rises up into the drainage well and, by stratification, the recovered gob gas exhausted by the methane-powered pump or exhauster can have a high methane concentration. Peak gas production and/or the highest quality generally may occur when the gob drainage well is initially undermined or intercepted by mining, and then may decrease as the working face advances away from the gob drainage well.

Gob gas quality may range from nearly 100% methane to as low as 25% methane. In some embodiments, the recovered gob gas may comprise at least 30% methane, or at least 50% methane. In preferred embodiments, the recovered gob gas may have a concentration of at least 70% methane, more preferably at least 80% methane, most preferably at least 90% methane. In additional or alternate preferred embodiments, the recovered gob gas may comprise at most 98% methane. In some embodiments, the gob gas may comprise any methane content between 25% and 98%, or between 70% and 98%.

Since the gob gas quality is generally at least 25% in methane content, there is generally no need to enrich the gob gas in methane.

The gas flow output from the gob drainage well may be at least about 5,660 m$^3$/day (or 200,000 ft$^3$/day) when the gob gas flow is facilitated by a pump or exhauster. With the use of a pump or exhauster, the gob gas flow output may be as high as about 85,000 m$^3$/day (or as high as 3,000,000 ft$^3$/day), or even higher. The gob gas flow rate may decrease over time as the lateral distance between the working face of the ore bed and the gob drainage well gets longer as the mining advances.

In addition to methane, the recovered gob gas may further comprise nitrogen, (diatomic) oxygen, nitrogen-containing compounds, ethane, propane, butane, other non-methane hydrocarbons, water, ammonia, carbon dioxide, or any mixtures thereof.

For the purpose of gob gas use as a primary fuel source when the ventilation air provides methane as supplemental fuel and air as combustion air, the lower content in methane of the recovered gob gas stream compared to commercial-grade natural gas is not an issue. As such, the recovered gob gas stream containing part of the mine methane can replace an equivalent energy content of a certain quantity of natural gas that would otherwise need to be purchased. It is estimated for example that up to 50% of the total natural gas consumption as fuel could be provided to a soda ash refinery by the mine methane collected as gob methane and VAM.

When only a portion of the volumetric flow of gob gas is directed to one or more surface appliances, any portion of the gob gas which is not used in the surface appliance(s) described above may be vented to atmosphere (not preferred) and/or may be directed to a flare or incinerator.

VAM Utilization

The invention can advantageously provide a source of energy for the surface facility which processes the mined non-combustible ore in order to extract the desired mineral, such as processing mined trona in a soda ash refinery. It is recommended that at least a part of the mine methane recovered in the ventilation air be directed to the ore processing facility or refinery to be used as an energy source for the operation of one or more pieces of equipment used in the processing facility. Examples of use may be heat generation by combustion, steam generation by boilers, electricity generation by turbines, and/or steam and power generation by co-generation units.

In the case of trona mining according to the invention, mined trona is preferably calcined in one or more calciners fueled by at least a portion of the mine methane recovered in the ventilation air and optionally in the gob gas. Calciners require heat generation, which can be provided by burning (combusting) at least a portion of the recovered mine methane (as ventilation air methane and optionally also as gob mine methane) in a furnace.

An embodiment of the use of VAM extracted from trona mining and an optional auxiliary fuel source in a surface appliance is illustrated in FIG. 1. A surface appliance 40' receives the ventilation air stream 10 (VAM) which is exhausted from the trona mine via fan 14. An optional auxiliary fuel source 35 such as natural gas may be directed to the surface appliance 40'. As shown in FIG. 1, VAM in stream 10 and the optional additional fuel source 35 are fed separately to the appliance 40 (but they could be fed as a mixed feed). At least part of the methane originating from the ventilation air stream 10 and optionally at least part of the fuel originating from the other fuel source 35 are combusted with air originating from ventilation air stream 10 in the appliance 40' to form an effluent 45 comprising water and carbon dioxide and an energetic output 50 which may be heat, steam, electricity, or combinations thereof. In embodiments when VAM is used as a primary fuel, typical surface appliance 40' in FIG. 1 may be a thermal oxidizer, a catalytic oxidizer, a lean burn catalytic turbine, and/or a microturbine. In embodiments when VAM is used as a supplemental fuel, a methane-containing auxiliary gas is preferably used as primary fuel, and typical surface appliance 40' in FIG. 1 may be a boiler, a calciner with a kiln or furnace, a dryer with a kiln or furnace, a co-generation plant, and/or a gas or steam turbine.

An embodiment of the use of both gob methane and VAM extracted from trona mining in a surface appliance is illustrated in FIG. 2. The surface appliance 40 receives the ventilation air stream 10 (VAM) which is exhausted from the trona mine via fan 14 and the gob gas stream 15 which is exhausted to the surface via exhauster 11. As shown in FIG. 2, VAM in stream 10 and the gob gas stream 15 are fed separately to the appliance 40 (although they could also be fed as a mixed feed). At least part of the methane originating from the ventilation air stream 10 and from the gob gas 15 are combusted with air originating from ventilation air stream 10 in the appliance 40 to form an effluent 45 comprising water and carbon dioxide and an energetic output 50 which may be heat, steam, electricity, or combinations thereof. In embodiments when VAM is used as a supplemental fuel, gob gas stream 15 is preferably used as primary fuel, and typical surface appliance 40 in FIG. 2 may be a boiler, a calciner with a kiln or furnace, a dryer with a kiln or furnace, a co-generation plant, and/or a gas or steam turbine.

Figure 4:
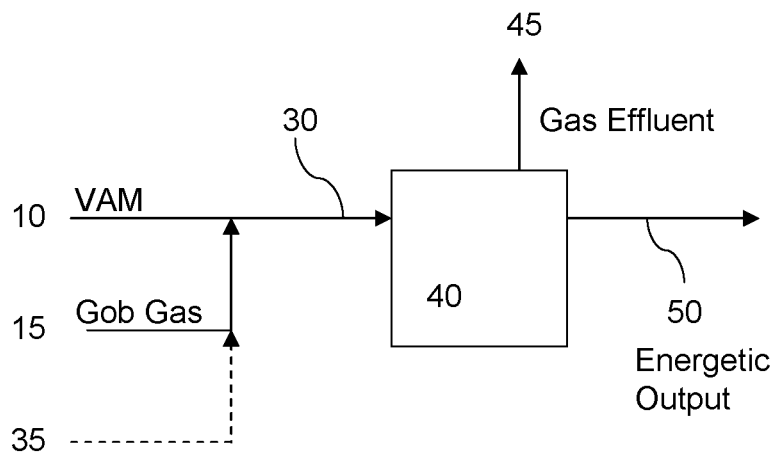
FIG. 4 illustrates a process flow diagram according to one embodiment of the present invention, in which the ventilation air methane (VAM) is used as supplemental fuel, and in which the ventilation air and an additional fuel source as primary fuel are both directed to a surface unit to generate heat, steam, and/or electricity.
Figure 5:
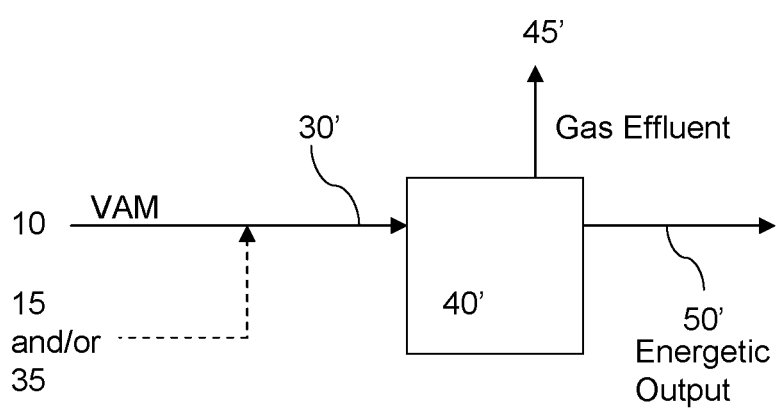
FIG. 5 illustrates a process flow diagram according to another embodiment of the present invention, in which the ventilation air methane (VAM) is used as primary fuel and is directed to a surface unit to generate heat, steam, and/or electricity.
Figure 6:
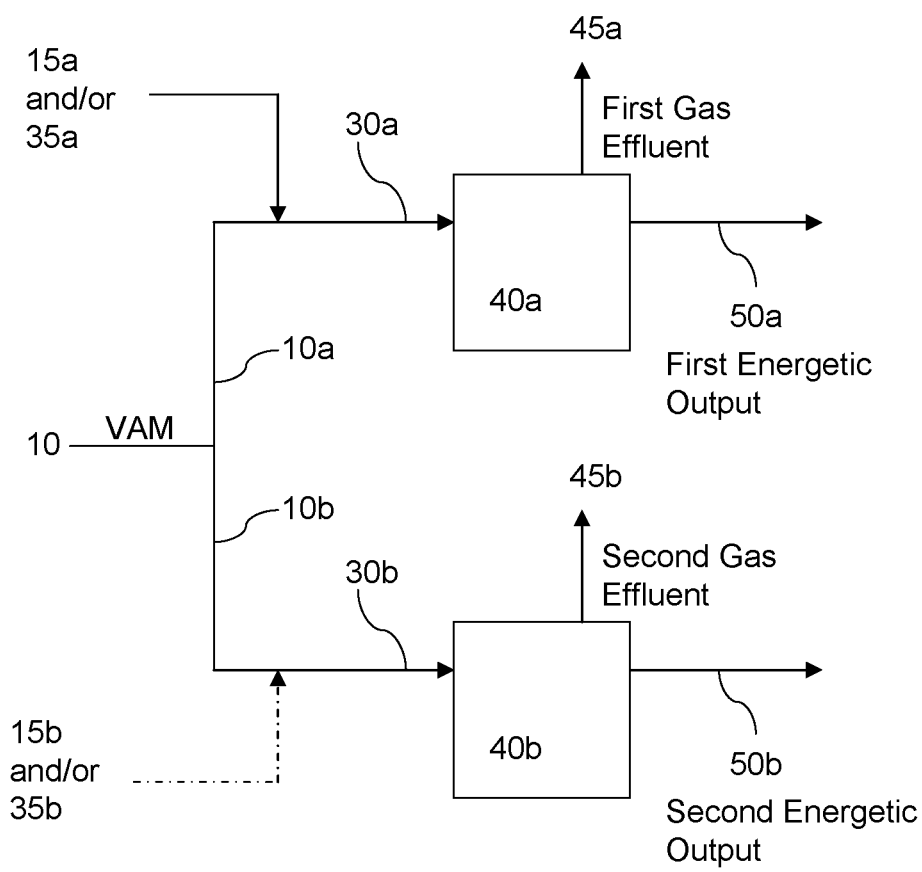
FIG. 6 illustrates a process flow diagram according to yet another embodiment of the present invention, in which the ventilation air methane (VAM) is directed in one portion to a first surface unit to generate heat and/or steam, and in another portion to a second surface unit to generate steam and/or electricity.

FIGS. 4 to 6 illustrate simplified process flow diagrams of various embodiments of the method according to the present invention in which the ventilation air containing methane is used in a surface appliance.

FIG. 4 shows a schematic diagram of a process comprising a surface appliance 40 which uses VAM as a supplemental fuel according to one embodiment of the present invention. Surface appliance 40 receives VAM 10 and one additional fuel source, e.g., a gob gas stream 15 and optionally another fuel source 35 such as natural gas or coal. As shown in FIG. 4, VAM and the additional fuel source(s): 15 and optionally 35 are first mixed to form a feedstock 30 which then is fed to the appliance 40 under oxidation conditions sufficient to form an effluent 45 comprising water and carbon dioxide and an energetic output 50 which may be heat, steam, electricity, or any combinations thereof. The feedstock 30 may have an overall methane level of at least 5% to about 33%. Typical surface appliance 40 in FIG. 4 may include a boiler, a kiln, a burner, a furnace, a calciner or dryer with a kiln or furnace, an electric power generation unit, a co-generation unit, and/or a gas or steam turbine.

FIG. 5 shows a schematic diagram of a process comprising a surface appliance 40' which uses VAM as a primary fuel to carry out yet another embodiment of the present invention. Contrary to FIG. 4, the additional fuel source: gob gas stream 15 and/or another fuel source 35 such as natural gas is optional and if needed it is directed to the appliance 40' in order for the methane content of the combined flows (represented by feedstock 30') to be from 0.8% to 2%. Typical surface appliance 40' may be a thermal oxidizer, a catalytic oxidizer, a lean burn catalytic turbine, a microturbine, or any combinations of two or more thereof. VAM and optionally the additional fuel source(s): 15 and/or 35 is/are fed to the appliance 40' under oxidation conditions sufficient to form an effluent 45' comprising water and carbon dioxide and an energetic output 50' which may include heat, steam, electricity, or any combinations thereof, preferably may be heat and/or electricity.

FIG. 6 shows a schematic diagram of a process comprising two surface appliances 40a and 40b, each of which receiving a portion of VAM as a primary or supplemental fuel to carry out yet an alternate embodiment of the method according to the present invention. Surface appliance 40a receives a first portion 10a of the VAM stream 10 and at least a portion of a gob gas stream 15a and/or at least an auxiliary fuel stream 35a such as natural gas or coal. VAM portion 10a and the additional fuel source(s): 15a and/or 35a are first mixed to form a feedstock 30a which then is fed to the appliance 40a under oxidation conditions sufficient to form a first effluent 45a comprising water and carbon dioxide and a first energetic output 50a which may include heat, steam, electricity, or any combinations thereof. Surface appliance

40*b* receives a second portion 10*b* of the VAM stream 10 and optionally another portion 15*b* of a gob gas stream and/or an auxiliary fuel source 35*b* such as natural gas or coal. VAM portion 10*b* and optionally additional fuel source(s): 15*b* and/or 35*b* is/are fed as feedstock 30*b* to the appliance 40*b* under oxidation conditions sufficient to form a second effluent 45*b* comprising water and carbon dioxide and a second energetic output 50*b* which may include heat, steam, electricity, or any combinations thereof.

In preferred embodiments, the energetic outputs 50*a* and 50*b* are different from each other. That is to say, at least one of the following energetic outputs: heat, steam, electricity is produced in one of the surface appliances 40*a* and 40*b* but not in the other surface appliance. For example, the energetic output 50*a* may comprise steam and/or heat but excludes electric power, while the energetic output 50*b* comprises electric power.

In other embodiments, the energetic outputs 50*a* and 50*b* include a common output. That is to say, at least one of the following energetic outputs: heat, steam, electricity is produced in both of the surface appliances 40*a* and 40*b*. For example, heat may be generated in both surface appliances 40*a* and 40*b*.

In preferred embodiments, surface appliances 40*a* and 40*b* both use VAM as supplemental fuel. The auxiliary fuel streams 35*a* and 35*b* may originate from the same fuel source such as coal delivered to at least one surface appliance for example in railcars and/or a natural gas generally delivered to at least one surface appliance for example via pipeline(s). For example, two portions (35*a* and 35*b*) of a natural gas stream are supplied respectively to appliances 40*a* and 40*b*. Or the auxiliary fuel streams 35*a* and 35*b* may originate from two different fuel sources. For example, gob gas (15*a*) and/or natural gas (35*a*) are supplied to appliance 40*a*, while coal (35*b*) is supplied to appliance 40*b*.

In other embodiments, surface appliance 40*a* uses VAM as supplemental fuel, while surface appliance 40*b* uses VAM as primary fuel. In this instance, the auxiliary fuel stream 35*b* (such as natural gas) and/or the gob gas portion 15*b* may be used solely to provide a methane content between 1 and 2% in the incoming gas flow of feedstock 30*b* to appliance 40*b*.

In some more preferred embodiment of FIG. 6, the surface appliance 40*a* may be a boiler, or a calciner or dryer with a kiln or furnace, while the surface appliance 40*b* may be an electric power generation plant, a co-generation plant, and/or a gas or steam turbine (the gas or steam turbine may be included in the electric power generation plant or the co-generation plant). When the surface appliance is a co-generation plant, at least a portion of the ventilation air methane and at least a part of the additional fuel source (streams 15 and/or 35) are combusted to generate heat which is ultimately used to produce steam and electricity.

In some more preferred embodiment of FIG. 6, the first portion 10*a* of the ventilation air methane 10 provides a first energy source to produce heat in the first surface appliance (appliance 40*a*) which may include or may be a boiler, a dryer comprising a kiln or furnace, or a calciner comprising a kiln or furnace, and the second portion 10*b* of the ventilation air methane 10 provides a second energy source to produce steam and/or electricity in the second surface appliance (appliance 40*b*) which may include or may be a turbine (e.g., gas or steam turbine), an electric power generation plant, or a co-generation plant (a gas or steam turbine may be included in the electric power generation plant or co-generation plant).

FIG. 4 and FIG. 5 illustrate the use of VAM in one surface appliance, while FIG. 6 illustrates the use of VAM in two separate surface appliances. It should be understood however that VAM may be utilized in more than two surface appliances.

VAM may be utilized simultaneously in two or more surface appliances.

VAM may be utilized in two or more surface appliances in alternating mode; that is to say VAM may be used in a first surface appliance for a given time, then VAM is directed and used in another (second) surface appliance for another given time; and then the sequence is repeated.

VAM may be utilized intermittently in at least one surface appliance. The intermittence of use may depend on the appliance downtime (no operation being carried out) and uptime (when in operation). That is to say VAM may be used only when a certain energetic output is needed to be generated for this surface appliance. For example VAM may be used only when heat is necessary for a dryer or calciner; when the dryer or calciner is not operating, the flow of ventilation air to the surface appliance may be stopped, and then may be resumed when the dryer or calciner is started up. In such instances, this flow of ventilation air may be diverted to another appliance, or may be vented to atmosphere, and/or may be directed to a flare or incinerator.

VAM may be utilized continuously or continually in at least one surface appliance.

Since the methane content in the air ventilation stream may vary over time, its energetic flow (Btu/hr) may be monitored and compared to a setpoint (preferably before entry in the surface appliance) so as to maintain an energetic flow value within acceptable limits. The control of the energetic flow may be effected by adjusting the volumetric or mass flow of the air ventilation stream (e.g., reducing its flow rate if the VAM energetic flow is too high or increasing its flow rate if the VAM energetic flow is too low) and/or may be effected by flowing an additional fuel source and adjusting the energetic flow (Btu/hr) of the additional fuel as well.

With respect to total operational costs and capital investments for ventilation air methane recovery and transport to surface appliance(s), for gob methane recovery via drainage well(s) and transport to surface appliance(s), the cost of drilling wells, laying out conduits for gas transport to the surface appliance(s), and purchasing fans, vacuum pumps, and/or exhausters may be offset by cost savings realized in utilizing a substantial amount of the mine methane recovered via ventilation air methane and drainage (gob) methane.

Carbon Credit and Reduction of "Greenhouse Gas"

The invention further allows the reduction of "Greenhouse Gas" (GHG) emissions by converting previously unrecoverable methane emissions into carbon dioxide by combustion.

In the case of trona mining according to the invention, the recovered mine methane may be used as an energy source in the soda ash refinery (such as combusted). It has been determined that methane is 21 times more potent than carbon dioxide as a GHG. Thus, conversion of mine methane to carbon dioxide by combustion (e.g., burning in the soda ash refinery) will reduce overall GHG emissions by a factor of 18.25 tons of carbon dioxide equivalent per ton of mine methane, after accounting for the GHG contribution of carbon dioxide produced by combusting the mine methane.

The method according to the present invention may comprise registering a carbon dioxide emissions credit for carbon dioxide produced from the surface appliance on a credit market for trading, wherein the carbon dioxide emissions credit is defined as the difference in a greenhouse effect index between releasing mine methane gas to the atmosphere and releasing the combusted mine methane gas to the atmosphere as carbon dioxide.

Optional Cleanup of Ventilation Air and/or Additional Fuel before Utilization

It is envisioned that the ventilation air stream, the drainage gas stream, and/or other additional fuel source (as shown as streams 10, 15, 35 in FIG. 4) may be treated before being directed to the surface appliance(s). The treatment may comprise a removal of particulates (such as ore dust), of condensable vapors (such as water), of heavy constituents, of nitrogen gas ($N_2$), and/or removal of any other constituents which may cause an operational issue in the surface appliance. In some embodiments, the treatment may include one or more filtration units, one or more cyclonic separation units, one or more condensers, flash distillation, one or more water traps, or the like. As shown in FIG. 2 for example, the gob gas stream 15 is passed through an optional cleaning unit 55 in which particulates such as trona dust and/or water vapor may be removed.

EXAMPLE

The method for utilization of VAM and gob gas may be exemplified as follows using a process flow scheme as illustrated in FIG. 4. VAM (stream 10) with an energetic flow of 1.2 trillions Btu per year, a gob gas (stream 15) with an energetic flow of 0.8 trillion Btu per year, and a purchased natural gas (stream 35) with an energetic flow of 1.7 trillion Btu per year are directed to a 45-Megawatt co-generation unit (40) to produce the following energetic output (50): about 400,000 MWH of electricity and about 154,000 pounds/hour of steam. It is expected that the reduction in greenhouse gas emissions will be about 55% less with the utilization of VAM and the gob gas in the co-generation plant.

This disclosure of all patent applications, and publications cited herein are hereby incorporated by reference, to the extent that they provide exemplary, procedural or other details supplementary to those set forth herein.

Should the disclosure of any of the patents, patent applications, and publications that are incorporated herein by reference conflict with the present specification to the extent that it might render a term unclear, the present specification shall take precedence.

In the application, where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components. Further, it should be understood that elements and/or features of an apparatus, a process, or a method described herein can be combined in a variety of ways without departing from the scope and disclosures of the present teachings, whether explicit or implicit herein.

The use of the singular herein includes the plural (and vice versa) unless specifically stated otherwise.

In addition, where the use of the term "about" is before a quantitative value, the present teachings also include the specific quantitative value itself, unless specifically stated otherwise. As used herein, the term "about" refers to a +−10% variation from the nominal value.

Accordingly, the scope of protection is not limited by the description set out above, but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention.

While preferred embodiments of this invention have been shown and described, modifications thereof can be made by one skilled in the art without departing from the spirit or teaching of this invention. The embodiments described herein are exemplary only and are not limiting. Many variations and modifications of systems and methods are possible and are within the scope of the invention.

The invention claimed is:

1. A method for utilizing ventilation air methane (VAM) exhausted during mining of a non-combustible ore from an underground formation which comprises an ore bed and at least one methane-bearing layer overlying the bed, underlying the bed, and/or imbedded in the bed, said method comprising:

mining at least a portion of the ore bed to extract non-combustible ore and form a mined-out cavity, said mining being carried out in a manner effective to cause exposure and/or fracture of at least one methane-bearing layer which releases mine methane into the mined-out cavity, wherein said non-combustible ore comprises sodium carbonate, sodium bicarbonate, sodium sesquicarbonate, or combinations thereof, applying an air flow to the mined-out cavity for ventilation in a manner sufficient to dilute the methane content in the mined-out cavity to provide a ventilation air stream containing at most 2% methane;

directing at least a portion of said methane-containing ventilation air stream exhausted to the surface to at least one surface appliance of a refinery where the mined non-combustible ore is processed, said at least at least one surface appliance comprising a co-generation plant, to use at least a part of the methane present in said portion of the ventilation air stream in said co-generation plant as a supplemental energy source and to use at least a portion of the air in said portion of the ventilation air stream as combustion air to generate heat, steam, and/or electricity, and directing an additional fuel source to such co-generation plant, said additional fuel source being a methane-containing gas with a methane content of at least 25%, wherein at least a portion of the ventilation air methane and at least a part of the additional fuel source are combusted in the co-generation plant; and wherein directing at least said portion of said methane-containing ventilation air stream and directing said additional fuel source result in a combined flow having an $O_2$:$CH_4$ molar ratio greater than 2 and having a methane content between 1 and 5%.

2. The method according to claim 1 wherein the concentration of methane in said ventilation air stream is at most 1%.

3. The method according to claim 1 wherein said non-combustible ore comprises trona.

4. The method according to claim 1 wherein the additional fuel source is a methane-containing gas with a methane content of at least 50%.

5. The method according to claim 1 wherein the additional fuel source is a natural gas stream or a drainage gas stream.

6. The method according to claim 1 wherein the mining step comprises longwall mining.

7. The method according to claim 1 wherein the portion of said ventilation air stream and the additional fuel source to said surface appliance are separately directed to said surface appliance.

8. A method for utilizing ventilation air methane (VAM) exhausted during mining of a non-combustible ore from an underground formation which comprises an ore bed and at least one methane-bearing layer overlying the bed, underlying the bed, and/or imbedded in the bed, said method comprising:
- mining at least a portion of the ore bed to extract non-combustible ore and form a mined-out cavity, said mining being carried out in a manner effective to cause exposure and/or fracture of at least one methane-bearing layer which releases mine methane into the mined-out cavity, wherein said non-combustible ore comprises sodium carbonate, sodium bicarbonate, sodium sesquicarbonate, or combinations thereof,
- applying an air flow to the mined-out cavity for ventilation in a manner sufficient to dilute the methane content in the mined-out cavity to provide a ventilation air stream containing at most 2% methane; and
- directing at least a portion of said methane-containing ventilation air stream exhausted to the surface to at least one surface appliance of a refinery where the mined non-combustible ore is processed, to use at least a part of the methane present in said portion of the ventilation air stream in said at least one surface appliance as an energy source to generate heat, steam, and/or electricity, wherein during mining, the roof of the mined-out cavity is allowed to cave in to form a gob thereby allowing the released mine methane to flow into the gob, and wherein the method further comprises recovering a gob gas stream comprising at least part of the released methane through a drainage well in fluid communication with the gob to the surface, and directing at least a portion of said gob gas stream to at least one surface appliance, wherein the surface appliance receiving the gob gas stream is the same or different than the surface appliance receiving the ventilation air stream.

9. The method according to claim 8 wherein the surface appliance is selected from the group consisting of calciner, dryer, boiler, furnace, burner, kiln, internal combustion engine, gas turbine, steam turbine, power generation plant, co-generation unit, any plurality thereof, and any combinations of two or more thereof.

10. The method according to claim 8 wherein the surface appliance is a calciner or dryer comprising a kiln or furnace, wherein the gob gas stream used as additional fuel source and the ventilation air are both directed to the kiln or furnace of the calciner or dryer, and wherein at least a portion of the ventilation air methane and at least a portion of the gob gas stream used as additional fuel source are combusted in the kiln or furnace to produce heat for the calciner or dryer.

11. The method according to claim 8 wherein the surface appliance is a co-generation plant, wherein the gob gas stream used as additional fuel source and the ventilation air are both directed to the co-generation plant, and wherein at least a portion of the ventilation air methane and at least a part of the gob gas stream used as additional fuel source are combusted in the co-generation plant to ultimately generate steam and electricity.

12. The method according to claim 8, wherein a first portion of the ventilation air methane provides a first energy source to produce heat and/or steam in a first surface appliance, and wherein a second portion of the ventilation air methane provides a second energy source in a second surface appliance to produce steam and/or electricity.

13. The method according to claim 12 wherein the first surface appliance is a dryer or calciner comprising a kiln or furnace, and wherein the second surface appliance is a turbine, an electrical power generation plant, or a co-generation plant.

14. The method according to claim 8 wherein the concentration of methane in the recovered gob gas is at least 25% and at most 98%.

15. A method for reducing green house emissions during mining of a non-combustible ore with co-production of ventilation air methane (VAM) and a gob gas stream from an underground formation, said underground formation comprising at least one methane-bearing layer and an ore bed to be mined comprising said non-combustible ore, comprising: utilizing the method according to claim 8, wherein said non-combustible ore comprises trona.

16. The method according to claim 15 wherein the mining step comprises longwall mining.

17. The method according to claim 8 wherein the mining step comprises longwall mining.

18. The method according to claim 8 wherein said non-combustible ore comprises trona.

19. The method according to claim 8 wherein the concentration of methane in said ventilation air stream is at most 1%.

20. The method according to claim 8 wherein the concentration of methane in the gob gas stream is at least 25%.

21. The method according to claim 8 wherein the gob gas stream is passed through a cleaning unit in which particulates, water vapor, or both are removed.

22. A method for utilizing ventilation air methane (VAM) exhausted during mining of a non-combustible ore from an underground formation which comprises an ore bed and at least one methane-bearing layer overlying the bed, underlying the bed, and/or imbedded in the bed, said method comprising:
- mining at least a portion of the ore bed to extract non-combustible ore and form a mined-out cavity, said mining being carried out in a manner effective to cause exposure and/or fracture of at least one methane-bearing layer which releases mine methane into the mined-out cavity, wherein said non-combustible ore comprises sodium carbonate, sodium bicarbonate, sodium sesquicarbonate, or combinations thereof,
- applying an air flow to the mined-out cavity for ventilation in a manner sufficient to dilute the methane content in the mined-out cavity to provide a ventilation air stream containing at most 2% methane;
- directing at least a portion of said methane-containing ventilation air stream exhausted to the surface to at least one surface appliance of a refinery where the mined non-combustible ore is processed, said at least at least one surface appliance comprising a co-generation plant, to use at least a part of the methane present in said portion of the ventilation air stream in said co-generation plant as a supplemental energy source and to use at least a portion of the air in said portion of the ventilation air stream as combustion air to generate heat, steam, and/or electricity, and
- directing an additional fuel source to such co-generation plant, said additional fuel source being a methane-containing gas with a methane content of at least 25%, wherein at least a portion of the ventilation air methane and at least a part of the additional fuel source are combusted in the co-generation plant; and wherein directing the at least said portion of said ventilation air stream and directing said additional fuel source result in a combined flow having a methane content between 1 and 5%.

* * * * *